US012372898B2

(12) United States Patent
Luo et al.

(10) Patent No.: US 12,372,898 B2
(45) Date of Patent: Jul. 29, 2025

(54) TONER CARTRIDGE HAVING ALLEVIATED TONER SCATTERING

(71) Applicant: Ninestar Corporation, Zhuhai (CN)

(72) Inventors: Qin Luo, Zhuhai (CN); Jianxin Cao, Zhuhai (CN); Yue Pan, Zhuhai (CN); Qijie Liang, Zhuhai (CN); Likun Zeng, Zhuhai (CN)

(73) Assignee: NINESTAR CORPORATION, Zhuhai (CN)

( * ) Notice: Subject to any disclaimer, the term of this patent is extended or adjusted under 35 U.S.C. 154(b) by 0 days.

(21) Appl. No.: 17/921,107

(22) PCT Filed: Mar. 20, 2021

(86) PCT No.: PCT/CN2021/081934
§ 371 (c)(1),
(2) Date: Oct. 24, 2022

(87) PCT Pub. No.: WO2021/185370
PCT Pub. Date: Sep. 23, 2021

(65) Prior Publication Data

US 2024/0288795 A1 Aug. 29, 2024

(30) Foreign Application Priority Data

Mar. 30, 2020 (CN) ......................... 202020359423.3
Mar. 13, 2021 (CN) ......................... 202120531711.7

(51) Int. Cl.
*G03G 15/08* (2006.01)
*G03G 21/16* (2006.01)
*G03G 21/18* (2006.01)

(52) U.S. Cl.
CPC ..... *G03G 15/0872* (2013.01); *G03G 15/0822* (2013.01); *G03G 15/0865* (2013.01);
(Continued)

(58) Field of Classification Search
CPC ........... G03G 15/0822; G03G 15/0865; G03G 15/0867; G03G 15/087; G03G 15/0872;
(Continued)

(56) References Cited

U.S. PATENT DOCUMENTS

2014/0286670 A1* 9/2014 Takahashi .......... G03G 15/0865 399/83
2019/0212694 A1 7/2019 Katayama et al.
(Continued)

FOREIGN PATENT DOCUMENTS

CN 101813902 A 8/2012
CN 107589647 A 1/2018
(Continued)

OTHER PUBLICATIONS

The World Intellectual Property Organization (WIPO) International Search Report With Translation and Written Opinion for PCT/CN2021/081934 Jun. 18, 2021 6 Pages (including translation).

*Primary Examiner* — Joseph S Wong
(74) *Attorney, Agent, or Firm* — ANOVA LAW GROUP PLLC

(57) ABSTRACT

A toner cartridge detachably installed in an electronic imaging device is provided. The electronic imaging device includes a developer replenishing device that includes a developer receiving component and the developer receiving component includes a movable connection component and a receiving port. The toner cartridge includes a cartridge body used for storing developer and a toner discharge structure connected to a toner discharge end of the cartridge body for discharging the developer from the toner cartridge. The toner discharge structure includes a fixed toner discharge plate, a guide component and a toner outlet. The guide component has a first end component and a second end component. The toner discharge structure further includes a holding component. When the toner cartridge is installed in
(Continued)

the electronic imaging device, the connection component moves from the guide component to the holding component relative to the guide component.

17 Claims, 42 Drawing Sheets

(52) U.S. Cl.
CPC ....... *G03G 15/0867* (2013.01); *G03G 15/087* (2013.01); *G03G 15/0877* (2013.01); *G03G 15/0886* (2013.01); *G03G 15/0896* (2013.01); *G03G 21/1647* (2013.01); *G03G 21/1676* (2013.01); *G03G 21/1821* (2013.01)

(58) Field of Classification Search
CPC ........... G03G 15/0877; G03G 15/0886; G03G 15/0896; G03G 21/1647; G03G 21/1676; G03G 21/1821
See application file for complete search history.

(56) References Cited

U.S. PATENT DOCUMENTS

| | | | | |
|---|---|---|---|---|
| 2020/0233371 | A1* | 7/2020 | Takami .............. | G03G 21/1647 |
| 2021/0278801 | A1* | 9/2021 | Ishii ................... | G03G 15/0863 |

FOREIGN PATENT DOCUMENTS

| | | | |
|---|---|---|---|
| CN | 209929215 | U | 1/2020 |
| JP | H0695505 | A | 4/1994 |
| JP | 2005031229 | A | 2/2005 |

* cited by examiner

TONER CARTRIDGE HAVING ALLEVIATED TONER SCATTERING

CROSS-REFERENCE TO RELATED APPLICATION

This application is a national phase entry under 35 U.S.C § 371 of International Application No. PCT/CN2021/081934, filed on Mar. 20, 2021, which claims priority of Chinese Patent Application No. 202020359423.3, filed Mar. 30, 2020, and Chinese Patent Application No. 202120531711.7, filed on Mar. 13, 2021, the entire contents of all of which are incorporated herein by reference.

TECHNICAL FIELD

The present disclosure generally relates to the field of imaging technology and, more particularly, relates to a toner cartridge.

BACKGROUND

Electronic imaging devices are devices that form images on recording materials by electrophotographic image processing techniques, and that include, for example, electrophotographic copiers, laser printers, electrophotographic printers, fax machines, word processors, and the like. A toner cartridge for supplying developer (such as toner) can be detachably installed inside an electronic imaging device. As the developer continuously participates in electronic imaging, when the developer in the toner cartridge is used up, the toner cartridge needs to be replaced in time or new developer needs to be added into the toner cartridge. Correspondingly, the toner cartridge become one of the frequently replaced consumables in electronic imaging.

In existing technologies, the toner cartridge is installed in and detached from a developer replenishing device for receiving developer in an electronic imaging device. Every installation and detachment of the toner cartridge in the developer replenishing device involves connection and disconnection between a toner outlet of the toner cartridge and a toner receiving port of the developer replenishing device.

FIG. 1 is an exploded view of a toner cartridge that can be detachably installed on the developer replenishing device in the existing technologies. The toner cartridge 1 includes: a cartridge body 2 for accommodating developer, a toner discharge structure 3 located at a first end 21 in a length direction of the cartridge body 2, and a sliding plate 4 sliding relative to the toner discharge structure 3. The toner discharge structure 3 includes an upper flange component 3*a*, a lower flange component 3*b*, and structures inside the toner discharge structure 3 for discharging the toner in the cartridge body 2*a* such as a stirring frame, a toner mixing component, a toner outlet, etc. Different structures can be designed according to different discharge principles. In FIGS. 2*a*-2*c*, FIG. 2*a* is a schematic structural diagram of the developer replenishing device, FIG. 2*b* is a partially enlarged cross-sectional view of the developer replenishing device, and FIG. 2*c* is a perspective view of the developer receiving component. The developer replenishing device 8 includes at least a developer receiving component 11, a first sliding plate engaging component 8*a*, and a second sliding plate engaging component 8*b*. The developer receiving component 11 includes a receiving port 11*a*, a connection component 11*b* for opening and closing the receiving port 11*a*, a sealing component 13. A block 15 located in the receiving port 11*a* is used to seal the receiving port 11*a*, and the developer receiving component 11 is driven up and down by the connection component 11*b* such that the receiving port 11*a* and the block 15 are in a spaced or contact state. Correspondingly, the receiving port 11*a* is opened or closed. In addition, an elastic component 12 may be provided to make the connection component 11*b* rise against the elastic force of the elastic component 12 and descend under the elastic force of the elastic component 12. FIGS. 3*a*-3*c* show a guide rail structure on the lower flange component 3*b* of the toner discharge structure 3, and a process of the guide rail structure for lifting the connection component 11*b* in the developer replenishing device to open the receiving port 11*a* of the developer replenishing device. The guide rail structure includes a rising first component 3*b*2 and a second component 3*b*4. With the installation of the toner cartridge 1 in a direction of an arrow A, the first component 3*b*2 guides the connection component 11*b* to rise to open the receiving port 11*a*, and then continue to move on the second component 3*b*4 to a position where the toner outlet (not shown) in the toner cartridge is fully opened, such that the toner outlet in the toner cartridge and the receiving port 11*a* form a connected developer discharge channel. During the disassembly process of the toner cartridge, similarly, when the toner cartridge 1 moves in a direction B opposite to the installation direction A, the toner outlet port and the receiving port 11*a* in the toner cartridge are respectively closed. However, during the movement of the connection component 11*b* guided by the second component 3*b*4 of the guide rail, since the receiving port 11*a* has been fully opened and has risen to a sufficient height, it will be successively fitted to corresponding components at the bottoms of the toner discharge structure 3 and the bottom of the slide plate 4 respectively, and then continue to move in the A/B direction with the installation/removal of the toner cartridge. Even if the seal is performed and the positions are aligned, relative displacement will inevitably occur. Since the developer includes extremely light particulate toner, it is easy to be scattered by the elastic force because of the elastic deformation of each sealing components during friction and vibration during the relative displacement.

SUMMARY

To at least partially alleviate the above technical problems in the existing technologies, the present disclosure mainly provides a toner cartridge that may prevent the developer from being scattered.

To achieve above objects, the present disclosure may use following technical solutions.

The present disclosure provides a toner cartridge detachably installed in an electronic imaging device. The electronic imaging device includes a developer replenishing device including a developer receiving component and the developer receiving component includes a movable connection component and a receiving port. The toner cartridge includes a cartridge body configured for storing developer and a toner discharge structure connected to a toner discharge end of the cartridge body configured for discharging developer from the toner cartridge. The toner discharge structure includes a fixed toner discharge plate, a guide component and a toner outlet. The guide component has a first end component and a second end component. The toner discharge structure further includes a holding component. When the toner cartridge is installed in the electronic imaging device, the connection component moves from the guide component to the holding component relative to the guide component, such that the developer in cartridge body is able to flow into the electronic imaging device through the toner outlet and the receiving port.

In one embodiment, the holding component is closer to the toner outlet than the guide component.

In one embodiment, the guide component is arranged in a straight line and inclined on two opposite sidewalls of the fixed toner discharge plate, and the second end component is located above the first end component in a first direction.

In one embodiment, the guide component is movably disposed on the sidewall of the fixed toner discharge plate, and the guide component is able to move in a second direction and a direction opposite to the second direction.

In one embodiment, the toner discharge structure further includes a locking component. The locking component is movably disposed on the guide component. The locking component has an unlocking position and a locking position on the guide component. When the locking component moves with the guide component in the direction opposite to the second direction, the locking component is able to be located at the locking position and extends out of the guide component to limit the connection component In one embodiment, the holding component and the guide component are arranged at intervals, and the connection component is able to pass over a gap between the guide component and the holding component and then stay on the holding component.

In one embodiment, the holding component is inclined along a straight line where the guide portion is located; or, the holding component extends along the second direction.

In one embodiment, when the locking component is located at the locking position, the locking component protrudes from the guide component, and at least a portion of the locking component is located in the gap between the guide component and the holding component.

In one embodiment, the holding component is movably disposed on a sidewall of the fixed toner discharge plate.

In one embodiment, the holding component is able to move in the second direction after carrying the connection component guided by the guide component.

In one embodiment, the holding component is provided with a guide post, and the side wall of the fixed toner discharge plate is provided with a guide groove matching with the guide post, such that the holding component is able to move along the guide groove.

In one embodiment, the holding component is provided with an abutting surface, and the abutting surface abuts the connection component to drive the connection component to move with the holding component.

In one embodiment, the guide component is extendable and foldable.

In one embodiment, the guide component includes a first part and a second part; the first part is fixedly arranged on a side wall of the fixed toner discharge plate and is provided with a rail; and the second part is able to slide in the rail with respect to the first part.

In one embodiment, the guide component includes a pusher, and the second part is provided with a third force-receiving block; before the toner cartridge is installed in the electronic imaging device, the pusher acts on the second part to make the second part be in a folded state in which most of the first part overlaps; and when the toner cartridge is installed on the electronic imaging device, the connection component abuts against the third force-receiving block and pushes third force-receiving block to make the second part slide and extend along the rail.

In one embodiment, the holding component is connected to the second end component of the guide component.

In one embodiment, the holding component is made of fictitious sponge.

In one embodiment, the guide component includes a sheet structure, and a contact between the guide component and the connection component includes a line contact.

In comparison to the existing technologies, the toner cartridge provided by the present disclosure includes the guide component and the holding component. The receiving port for receiving the developer in the electronic imaging device is opened gradually by the guide component and the holding component. The receiving port does not abut against other components (such as the fixed toner discharge plate or movable toner discharge plate) in the toner discharge structure too early during the installation of the toner cartridge. And the developer may be prevented from scattering because of friction or vibration during the installation and movement of the toner cartridge.

DETAILED DESCRIPTION

Figure 1:
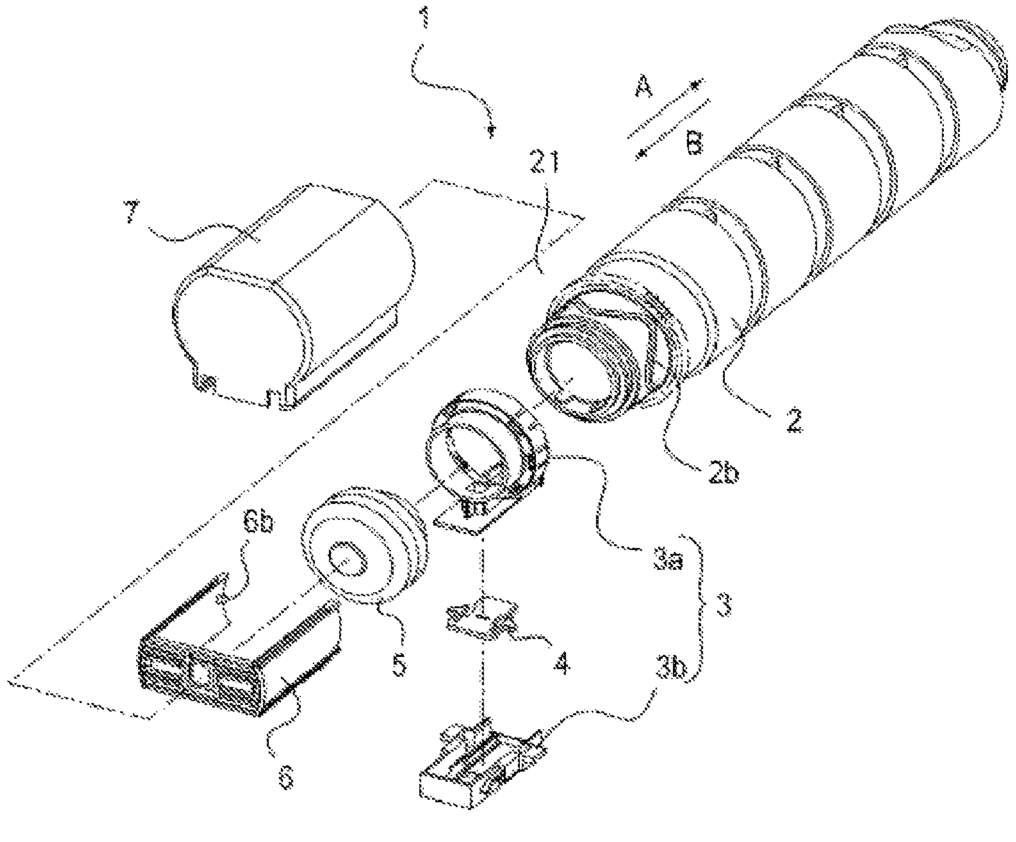
FIG. 1 illustrates an exploded view of a toner cartridge provided by the existing technologies.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like components, and a detailed description thereof may be omitted.

In the present disclosure, unless otherwise expressly specified and limited, the terms “first”, “second” or “third” are only used for the purpose of description, and cannot be construed as indicating or implying relative importance. Unless otherwise specified or explained, the term “multiple” refers to two or more. The terms “connected” and “fixed” should be understood in a broad sense. For example, “connected” may be a fixed connection, a detachable connection, an integral connection, or an electrical connection. It can be directly connected or indirectly connected through an intermediate medium. For those of ordinary skill in the art, the specific meanings of the above terms in the present disclosure can be understood according to specific situations.

In the present disclosure, it should be understood that the directional terms such as "upper" or "lower" described in the embodiments of the present disclosure are described from the perspective shown in the drawings, and should not be understood as limitation on the embodiments of the present disclosure. Also, in this context, it should also be understood that when an element is referred to as being "on" or "under" another element, it may not only be directly connected "on" or "under" the other element, but may also indirectly connected "on" or "under" another element through intermediate elements.

Embodiment 1

Figure 2A:
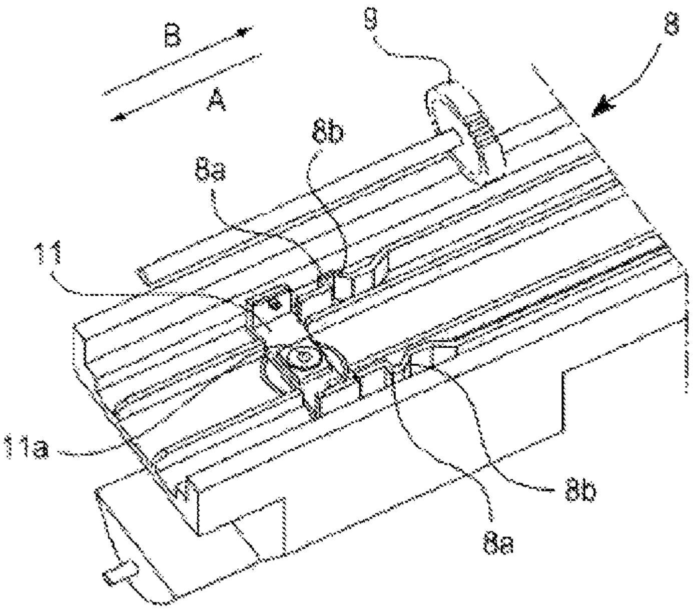
FIG. 2*a* illustrates a schematic structure of a developer replenishing device.
Figure 2B:
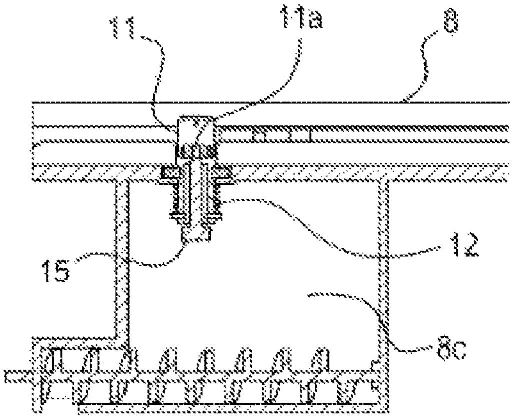
FIG. 2*b* illustrates a locally enlarged view of the developer replenishing device.
Figure 2C:
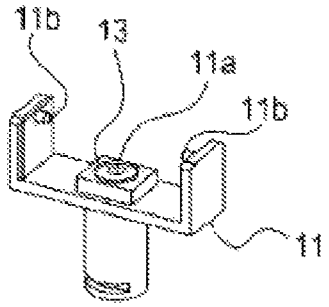
FIG. 2*c* illustrates a perspective view of a developer receiving component.
Figure 3A:
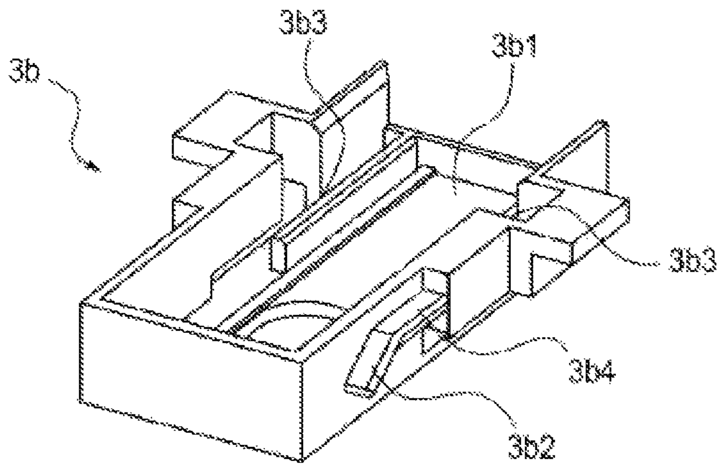
FIG. 3*a* illustrates a guide rail structure of the toner cartridge provided by the existing technologies.
Figure 3B:
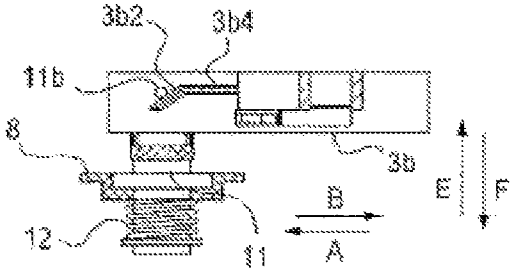
FIG. 3*b* illustrates another guide rail structure of the toner cartridge provided by the existing technologies.
Figure 3C:
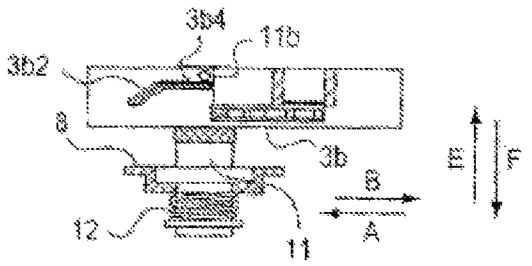
FIG. 3*c* illustrates another guide rail structure of the toner cartridge provided by the existing technologies.

One embodiment of the present disclosure provides a toner cartridge. The toner cartridge may be detachably installed in an electronic imaging device. The toner cartridge provided by the present disclosure may be installed on a developer replenishing device 8 in the electronic imaging device, with a manner similar to toner cartridges in the existing technologies as shown in FIGS. 2*a* to 2*c*.

Figure 4:
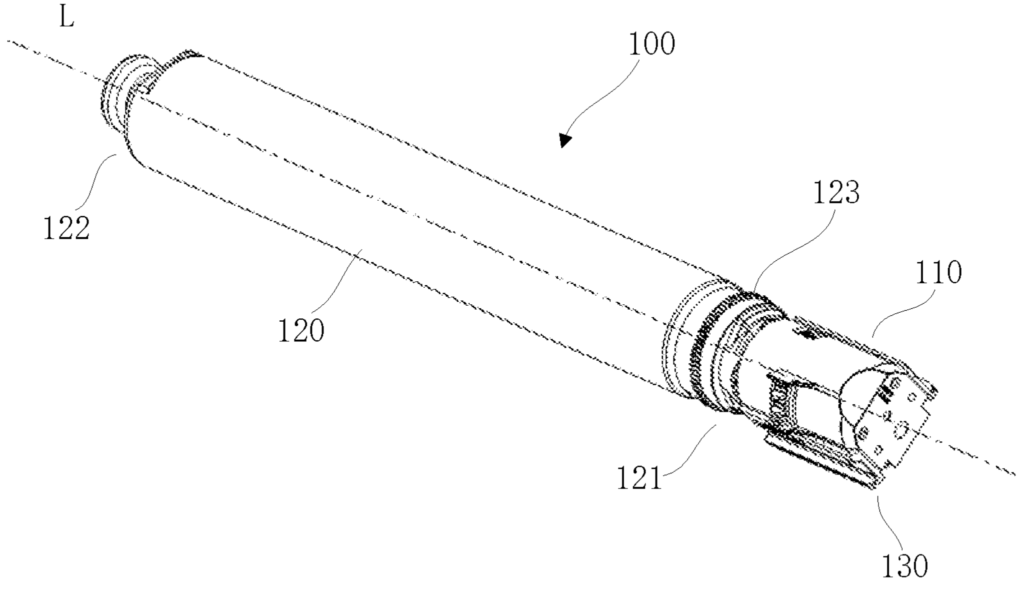
FIG. 4 illustrates a structure of a toner cartridge according to Embodiment 1 of the present disclosure.
Figure 5:
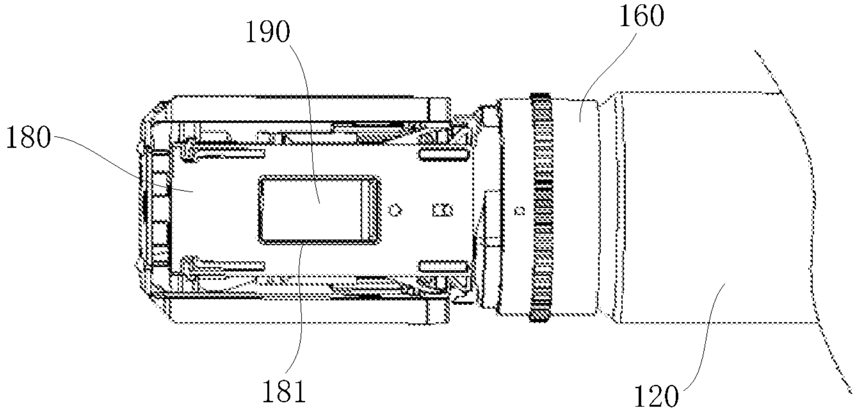
FIG. 5 illustrates a structure of the toner cartridge at a position of a toner discharge structure according to Embodiment 1 of the present disclosure.
Figure 6:
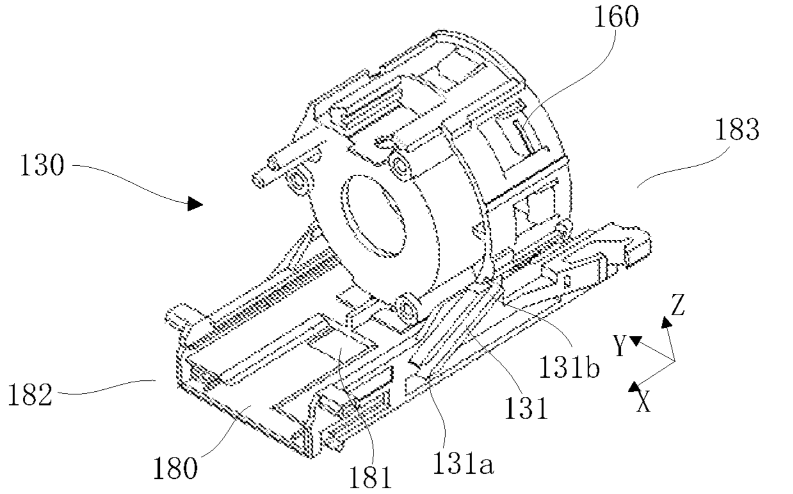
FIG. 6 illustrates a toner discharge structure of the toner cartridge according to Embodiment 1 of the present disclosure.

As shown in FIGS. 4-6, the toner cartridge 100 may include a housing 110, a cartridge body 120, and a toner discharge structure 130. The cartridge body 120 may be generally a long cylindrical structure in this embodiment. In an extending direction of the length of the cartridge body 120, two ends of the cartridge body 120 may be a first end 121 and a second end 122, respectively. The first end 121 may be a toner outlet end, and the cartridge body 120 may include an accommodating cavity inside for storing the developer. When the toner cartridge 100 is installed in the electronic imaging device, the cartridge body 120 may be driven to rotate around its rotation axis L in the electronic imaging device. The toner discharge structure 130 may be connected to the first end 121 and used for discharging the developer in the cartridge body 120 to the electronic imaging device to participate in development. The housing 110 may cover the toner discharge structure 130.

Further, a ring gear 123 may be provided on the cartridge body 120. The ring gear 123 may be engaged with the electronic imaging device to obtain rotational driving force from the electronic imaging device, therefore driving the cartridge body 120 to rotate around its rotation axis L and relative to the toner discharge structure 130.

Figure 7:
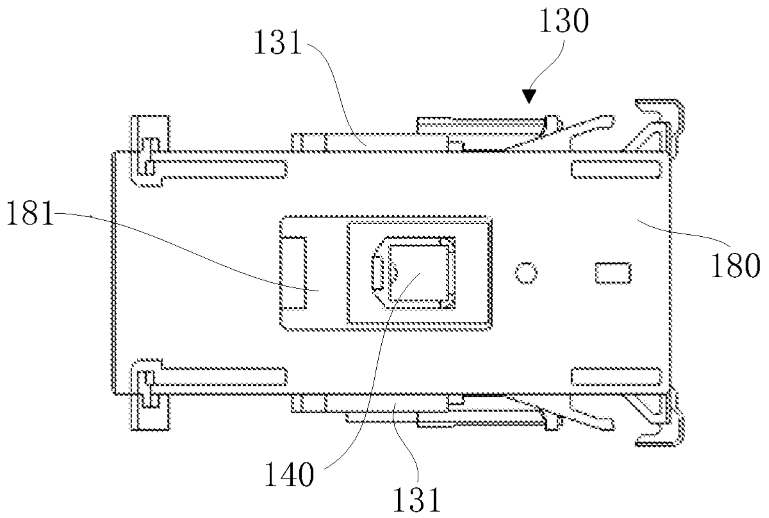
FIG. 7 illustrates another toner discharge structure of the toner cartridge according to Embodiment 1 of the present disclosure.

The toner discharge structure 130 may include a connection component 160 and a fixed toner discharge plate 180. The connection component 160 may be connected to the first end 121 of the cartridge body 120, and the connection component 160 may be provided with a toner outlet 140 (as shown in FIG. 7). The fixed toner discharge plate 120 may be connected to the connection component 160, and the fixed toner discharge plate 120 may be provided with an opening 181. In a first direction (the Z direction in FIG. 6), a projection of the toner outlet 140 and a projection of the opening 181 may at least partially overlap. In one embodiment, the projection of the toner outlet 140 in the first direction may completely fall within the projection of the opening 181 in the first direction. The mechanical structure inside the toner discharge structure 130 may include a structure set according to different toner feeding principles in the existing technologies, which will not be repeated here.

In this embodiment, both the fixed toner discharge plate 180 and the toner outlet 140 may be located at the bottom of the toner discharge structure 130. Specifically, the toner outlet 140 may be opened at the bottom of the connection component 160 and may be closer to the rotation axis L than the fixed toner discharge plate 180. The opening 181 may be opened at the bottom of the fixed toner discharge plate 180. The shape and size of the opening 181 may be larger than that of the toner outlet 140. In the first direction, the toner outlet 140 may be located above the opening 181. That is, a distance between the toner outlet 140 and the rotating shaft L may be smaller than a distance between the opening 181 and the rotating shaft L. Therefore, the developer stored inside the cartridge body 120 may be discharged to the outside of the toner cartridge through the toner outlet 140 and the opening 181.

The toner discharge structure 130 may further include a movable toner discharge plate 190. In the first direction, the movable toner discharge plate 190 may be disposed between the connection component 160 and the fixed toner discharge plate 180. A toner hole (not shown) may be provided on the movable toner discharge plate 190. When the toner cartridge is installed in the developer replenishing device in the electronic imaging device, a first sliding plate engaging component 8*a* and the second sliding plate engaging component 8*a* may be engaged with two side bumps (not shown) of the movable toner discharge plate 190, such that the movable toner discharge plate 190 are clamped and engaged with the developer replenishing device 8 to maintain a fixed state. The fixed toner discharge plate 180 may continue the installation action with the toner cartridge 100 along a second direction (the +X direction in FIG. 6). Correspondingly, the movable toner discharge plate 190 and the fixed toner discharge plate 180 may move relative to each other. When the opening 181 in the fixed toner discharge plate 180 and the toner outlet 140 gradually overlap through the toner hole in the movable toner discharge plate 190, a discharge channel may be formed and the developer stored in the cartridge body 120 may be discharged to the outside of the toner cartridge through the toner outlet 140, the toner outlet hole on the movable toner discharge plate 190 and the opening 181.

When the toner cartridge is installed in the electronic imaging device to guide the movement of the developer receiving component conveniently, the toner discharge structure 130 may further include a guide component 131. The guide component 131 may be used to guide a connection component 11*b* of a developer receiving component 11 in the developer replenishing device 8, to open a receiving port 11*a* with a simple structure and process. Specifically, as shown in FIG. 6, the fixed toner discharge plate 180 may include a first end body 182 away from the cartridge body 120 and a second end body 183 close to the cartridge body 120. In the direction of the rotation axis L, upwardly bent side walls may be provided on two sides of the fixed toner discharge plate 180 mirror, and the guide component 131 may be a protruding structure extending from the side walls on both sides of the fixed toner discharge plate 180, respectively.

Specifically, the guide component 131 may be connected to the side wall of the fixed toner discharge plate 180, and the guide component 131 may be inclined in a straight line or inclined in a curved line in the direction from the first end body 182 to the second end body 183. The guide component 131 may include a first end component 131*a* and a second end component 131*b*. The second end component 131*b* may be closer to the rotation axis L than the first end component 131*a*, that is, in the first direction, the second end component 131*b* may be located above the first end component 131*a* and the second end component 131*b* may be also located above the toner outlet 140. In this embodiment, at the second end component 131*b*, the slope of the inclination of the guide component 131 may be not 0. That is, the guide component 131 near the second end component 131*b* may be not parallel to the rotation axis L. When the toner cartridge is installed in the electronic imaging device, the developer receiving component may move from the first end component 131*a* to the second end component 131*b* along the guide component 131, such that the developer in the cartridge body 120 may flow into the electronic imaging device through the toner outlet 140 and the developer receiving component.

Figure 8A:
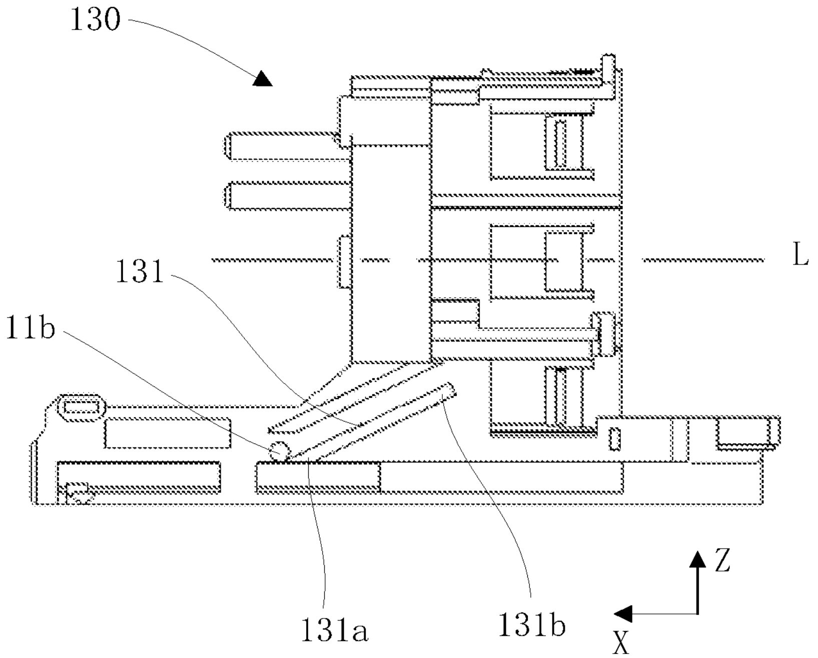
FIG. 8*a* illustrates a schematic structure when the toner cartridge is located at a first position for a receiving port 11*a* to be opened according to Embodiment 1 of the present disclosure.
Figure 8B:
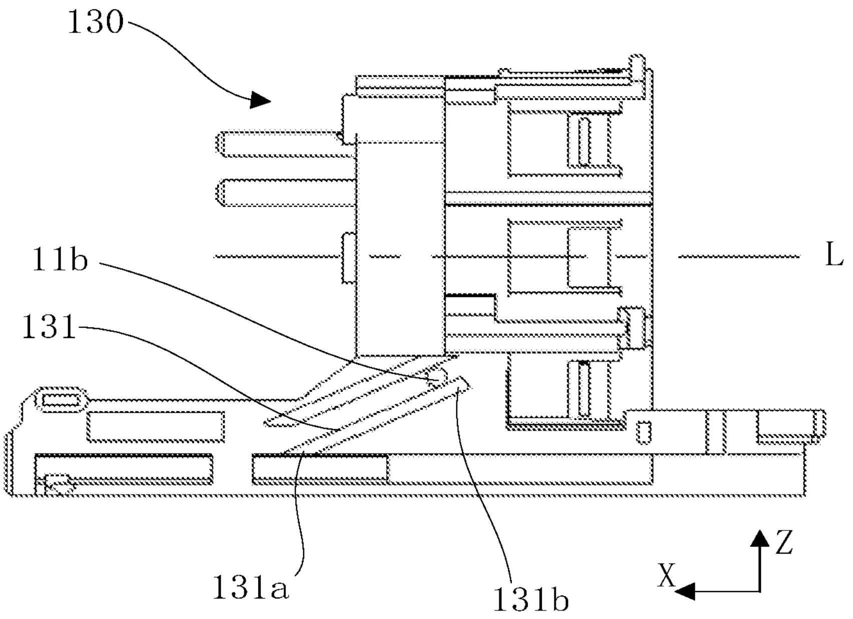
FIG. 8*b* illustrates a schematic structure when the toner cartridge is located at a second position where an outlet channel is formed and the receiving port 11*a* is opened, according to Embodiment 1 of the present disclosure.

As shown in FIG. 8*a* and FIG. 8*b* at the same time, taking the installation operation of the toner cartridge as an example, as the toner cartridge 100 is installed on the developer replenishing device 8 along the second direction (+X direction in FIG. 8*a*), in FIG. 8*a*, the toner cartridge may be located at the first position of the receiving port 11*a* to be opened. The connection component 11*b* for opening and closing the receiving port 11*a* may be located at the first end component 131*a* of the guide component 131. As the toner cartridge moves further in the second direction, the guide component 131 guides the connection component 11*b* to gradually ascend to the second end component 131*b*. At this time, the upward movement of the connection component 11*b* may gradually open the receiving port 11*a*. Further, as the first sliding plate engaging portion 8*a* and the second sliding plate engaging portion 8*b* clamp the movable toner discharge plate 190, the toner outlet hole of the movable toner discharge plate 190, the toner outlet port 140 and the opening 181 may gradually form a developer discharge channel, and finally the receiving port 11*a* and the discharge channel may be matched and connected at the second end component 131*b*. The discharge channel may be located at the plane of the second end component 131*b* and perpendicular to the rotation axis L, the developer in the cartridge body 120 may be allowed to flow into the electronic image forming device. That is, as shown in FIG. 8*b*, the toner cartridge may be located at the second position where the discharge channel is formed and the receiving port 11*a* is opened. The developer in the toner cartridge may smoothly flow to the developer replenishing device at the second end component 131*b*. During the previous moving process, the receiving port 11*a* may be not fully opened. In this way, under the action of the guide component 131, the receiving port 11*a* may not be prematurely abutted against the fixed toner discharge plate 180 or the movable toner discharge plate 190 during the installation of the toner cartridge, and the developer may be prevented from scattering because of friction or vibration during the installation and movement of the toner cartridge.

Embodiment 2

Based on Embodiment 1, in the present embodiment, the toner discharge structure 130 may further include a holding component 132.

Figure 9:
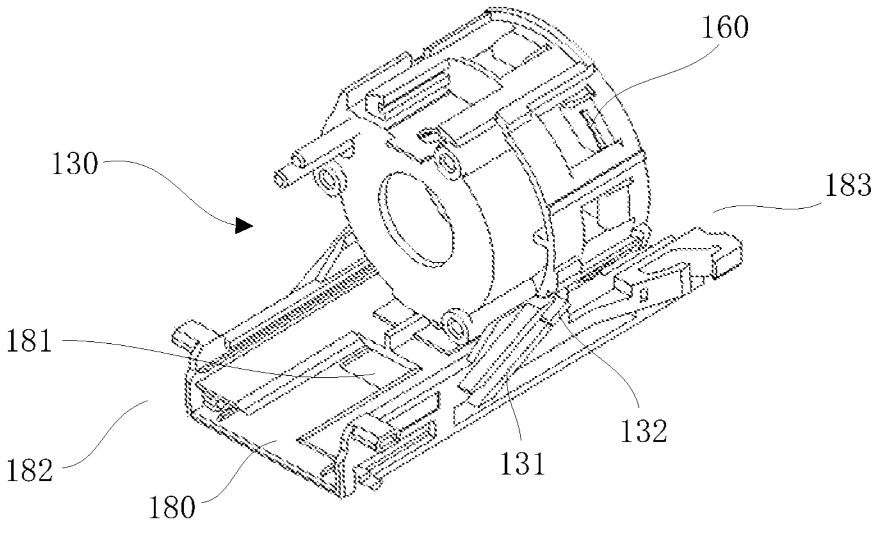
FIG. 9 illustrates a toner discharge structure according to Embodiment 2 of the present disclosure.
Figure 10A:
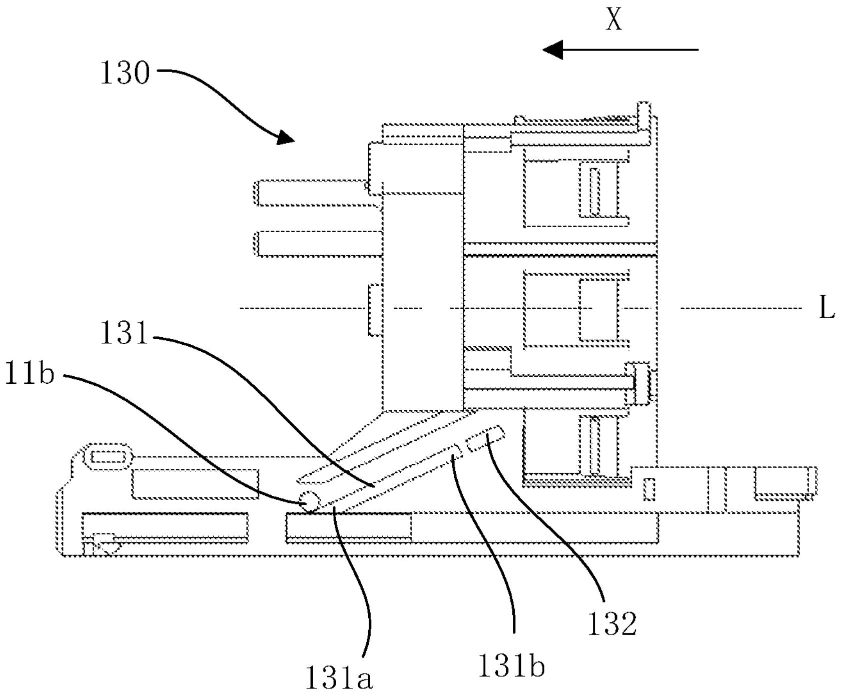
FIG. 10*a* illustrates a schematic structure when the toner cartridge is located at a first position for a receiving port 11*a* to be opened according to Embodiment 2 of the present disclosure.
Figure 10B:
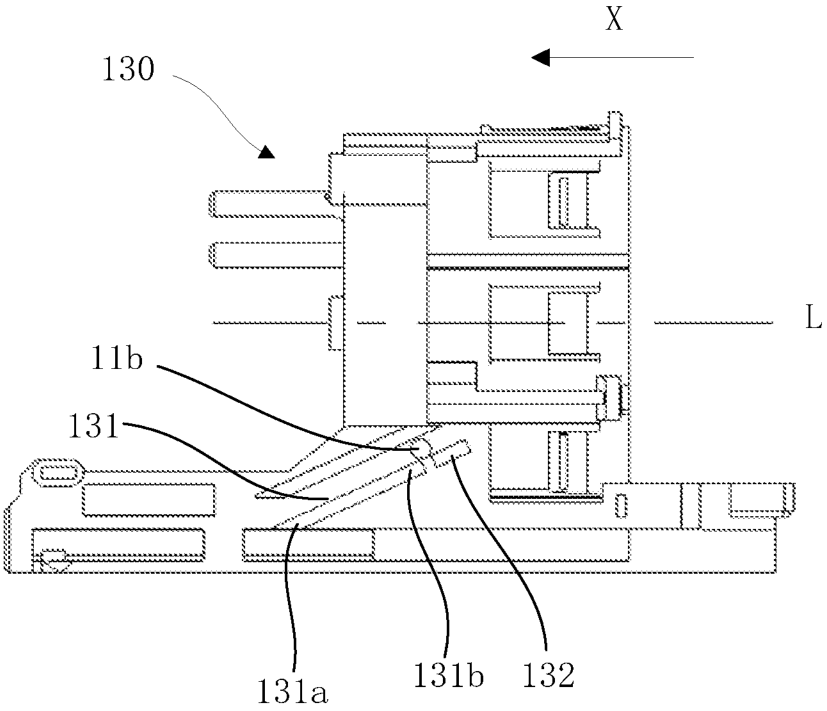
FIG. 10*b* illustrates a schematic structure when the toner cartridge is located at a second position where an outlet channel is formed and the receiving port 11*a* is opened, according to Embodiment 2 of the present disclosure.

As shown in FIGS. 9-10*b* among which FIG. 10*a* and FIG. 10*b* are respectively the first position of the toner cartridge in which the receiving port 11*a* to be opened and the second position in which the discharge channel is formed and the receiving port 11*a* is opened, the toner discharging structure 130 may further include a holding component 132. The holding component 132 may be used to limit the connection component when the toner cartridge is installed in the electronic imaging device. Preferably, in one embodiment, a pair of holding components 132 may be provided in a mirror symmetry at both side walls of the fixed toner discharge plate 180. The holding components 132 may be protrusions protruding outward from the side walls of the fixed toner discharge plate 180, and may be provided outside the guide component 131 or on the guide component 131. When the holding components 132 are provided outside the guide component 131, the holding components 132 may be independent parts spaced apart from the second end component 131*b* of the guide component 131 by a distance. That is, the holding components 132 and the second end components 131 *b* of the guide component 131 may be spaced apart, such that the connection component 11*b* moved to the second end component 131*b* is able to be snapped into the gap between the holding components 132 and the guide component 131, as shown in FIG. 10*b*, to maintain the open state of the receiving port 11*a*.

Figure 11:
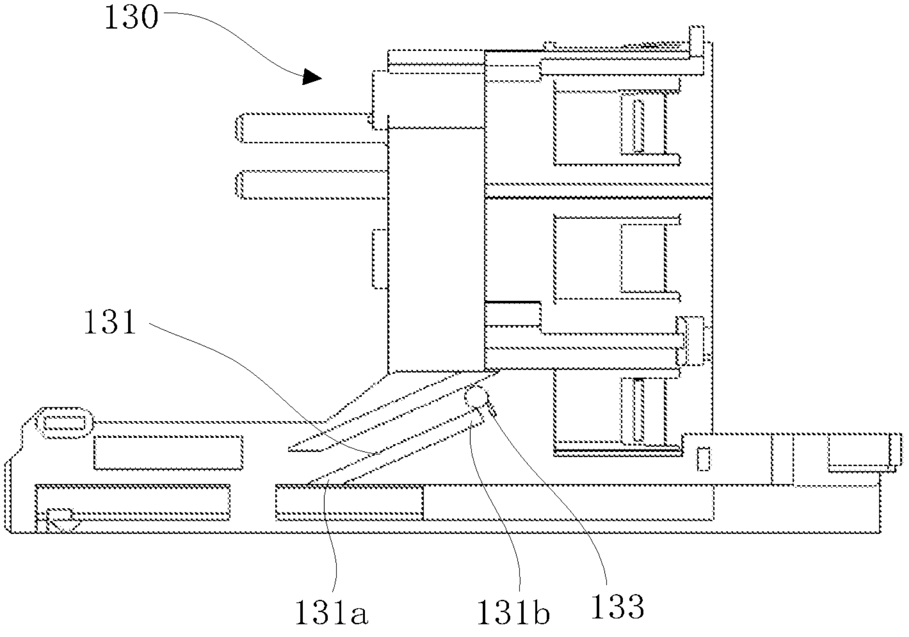
FIG. 11 illustrates a schematic transformation structure according to Embodiment 2 of the present disclosure.
Figure 12:
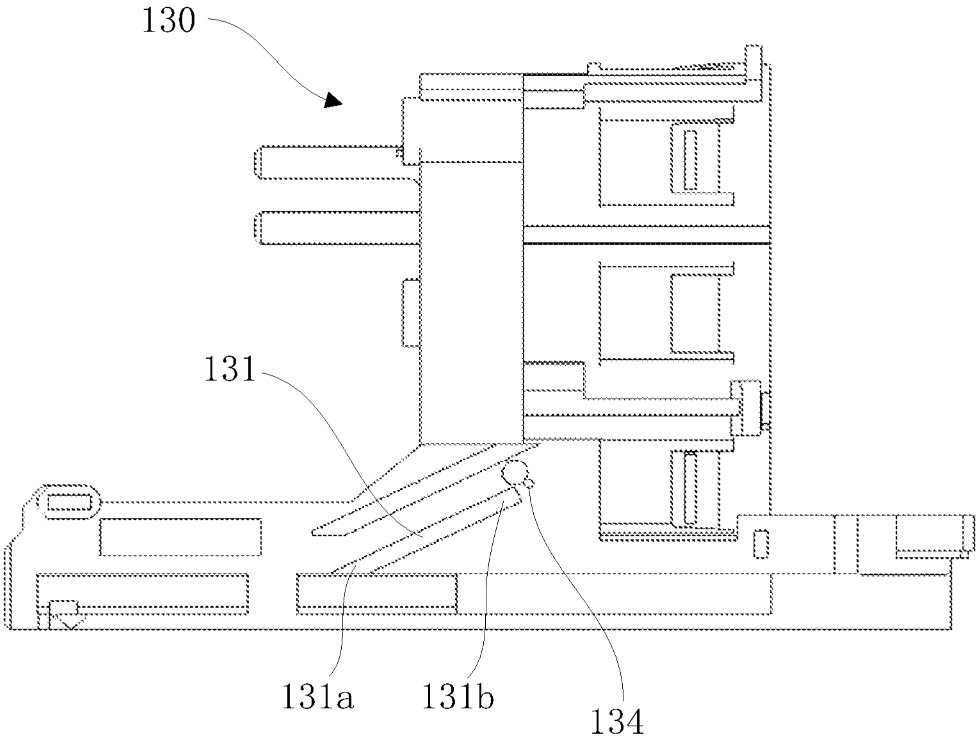
FIG. 12 illustrates another schematic transformation structure according to Embodiment 2 of the present disclosure.
Figure 13:
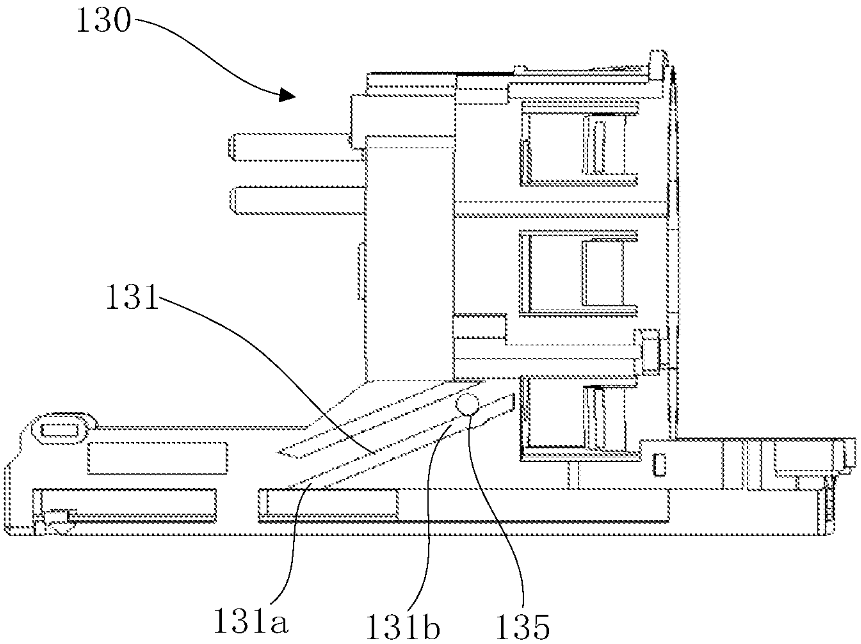
FIG. 13 illustrates another schematic transformation structure according to Embodiment 2 of the present disclosure.

In some other embodiments, the holding components 132 may have other structural deformations, sheet structures 133 as shown in FIG. 11, or cylindrical structures 134 as shown in FIG. 12, or polygonal structures whose cross section is triangular, conical, regular or irregular. When the toner cartridge is at the position where the discharge channel is formed and the receiving port 11*a* is opened, the gap between the holding components 132 and the guide component 131 may be used to keep the connection component 11*b* at the position where the receiving port 11*a* is opened. And, when the holding components 132 are disposed on the guide component 131, the holding components 132 may also be surfaces with a high friction coefficient on the second end component 131*b*, or grooves 135 as shown in FIG. 13. The clamp effect of the friction forces or the grooves may be used to hold the connection component 11*b* at the holding components, to maintain the position where the receiving port 11*a* is opened.

Preferably, in some embodiment, a chamfering structure may be provided on contact portions of the second end component 131*b* of the guide component 131 and the holding components 132 that are engaged with the connection component 11*b* (that is, the portions located at the gap), such that it is easier to disengage the toner cartridge from the clamping structure during the disassembly process.

Embodiment 3

The present embodiment provides another new toner cartridge. Parts that are not explicitly pointed out in this embodiment may be the same as the existing technologies and Embodiment 1. The present embodiment mainly introduces the structure of the connection component 11*b* for guiding the electronic imaging device.

Figure 14:
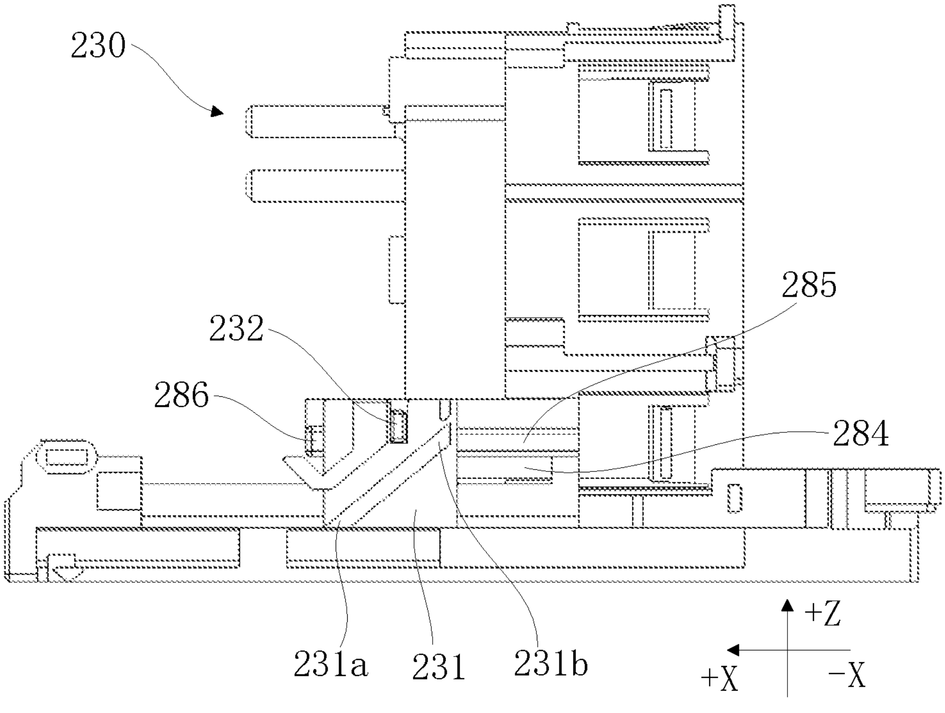
FIG. 14 illustrates a toner discharge structure according to Embodiment 3 of the present disclosure.
Figure 15:
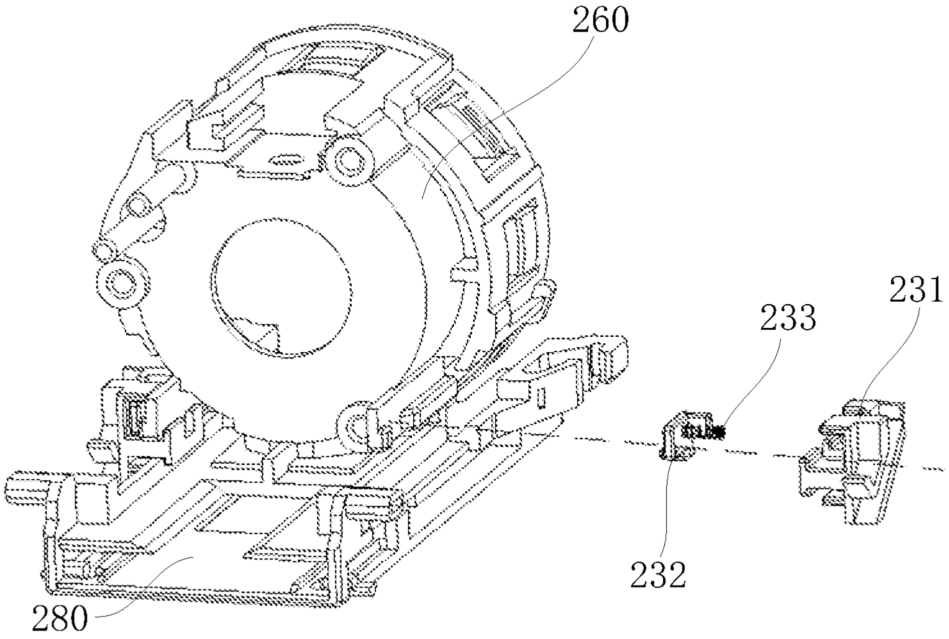
FIG. 15 illustrates an exploded view of the toner discharge structure according to Embodiment 2 of the present disclosure.
Figure 16:
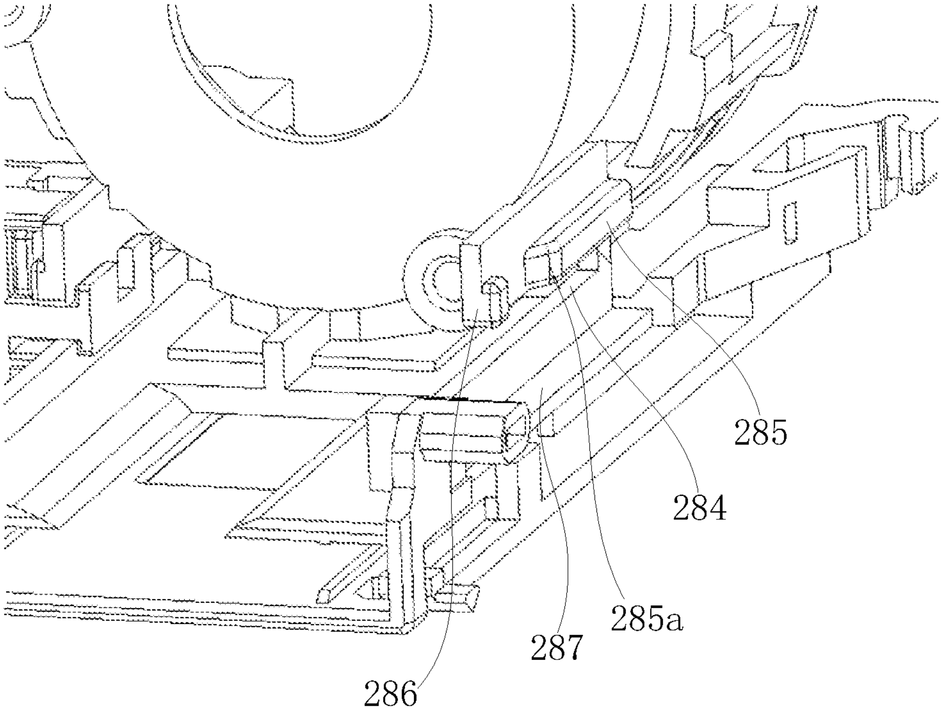
FIG. 16 illustrates a locally enlarged view of a fixed toner discharge plate of the toner discharge structure according to Embodiment 2 of the present disclosure.

As shown in FIGS. 14 to 16, FIG., FIG. 14 is a schematic diagram of the toner discharge structure in this embodiment, FIG. 15 is an exploded view of the toner discharge structure in this embodiment, and FIG. 16 is a partial enlarged view of the fixed toner discharge plate. The toner discharge structure 230 may include a connection portion 260, a fixed toner discharge plate 280 and a guide component 231 (guide member). The connection portion 260 may be connected to the first end of the cartridge body 120. The fixed toner discharge plate 280 may be connected to the connection portion 260, and the guide component 231 may be movably disposed on the side wall of the fixed toner discharge plate 280.

Figure 17:
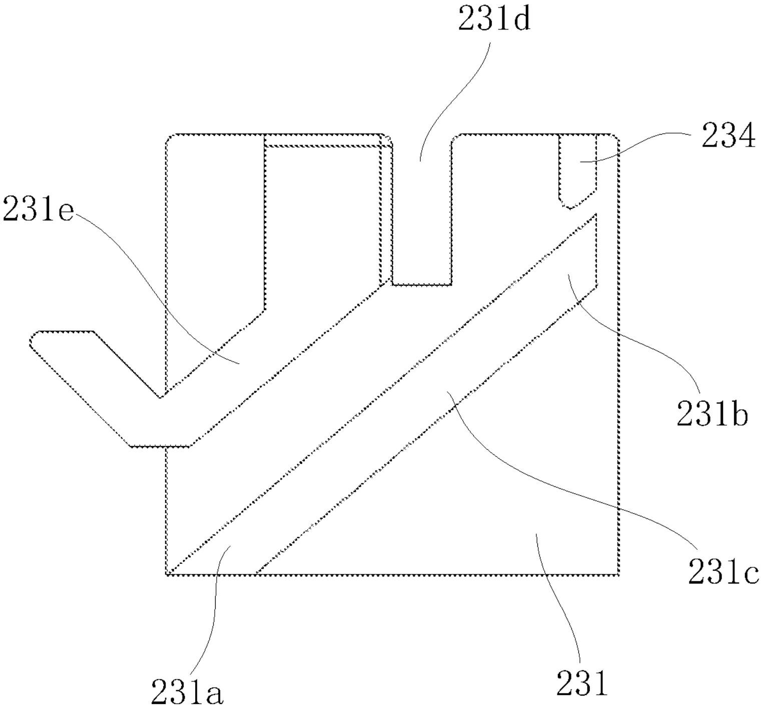
FIG. 17 illustrates a schematic view of a side surface of a guide component away from the fixed toner discharge plate of the toner discharge structure according to Embodiment 2 of the present disclosure.
Figure 18:
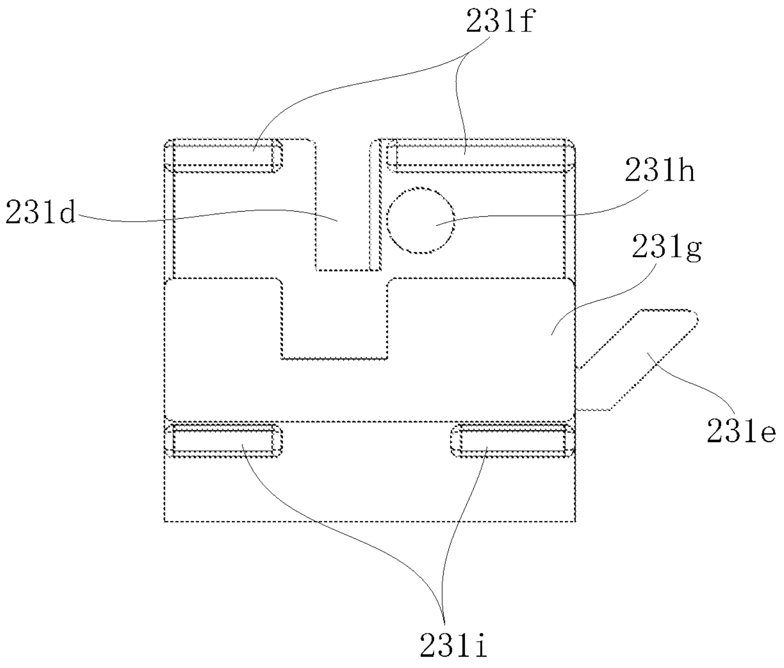
FIG. 18 illustrates a schematic view of a side surface of a guide component close to the fixed toner discharge plate of the toner discharge structure according to Embodiment 2 of the present disclosure.
Figure 19:
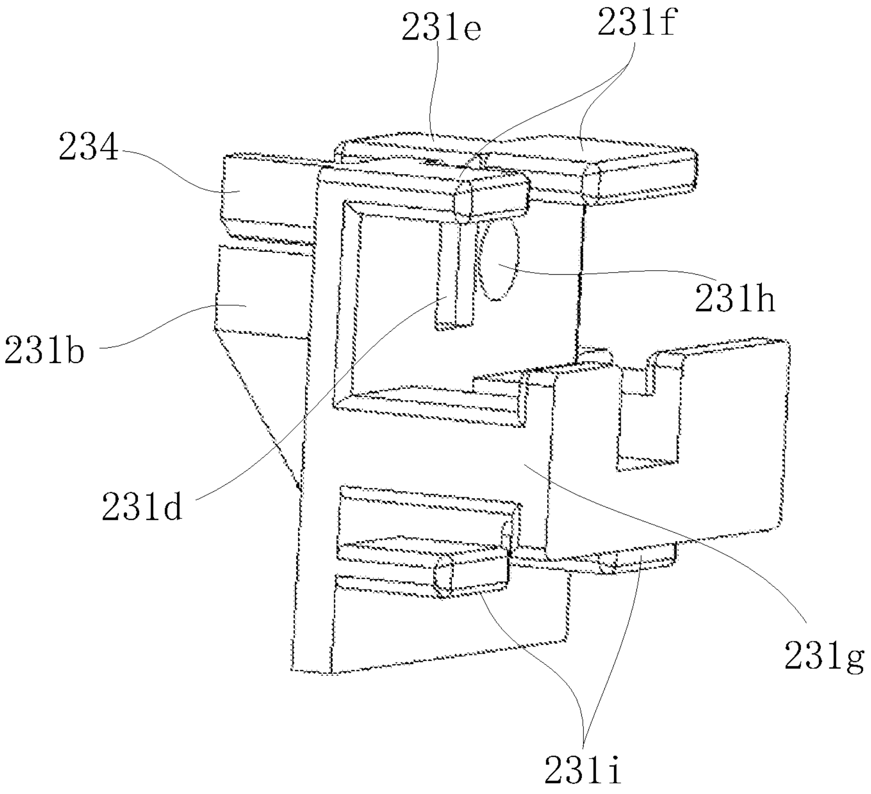
FIG. 19 illustrates a three-dimensional structure of the guide component according to Embodiment 3 of the present disclosure.

As shown in FIGS. 17 to 19, FIG. 17 is a schematic diagram of the surface of the guide component away from the fixed toner discharge plate, FIG. 18 is a schematic diagram of the surface of the guide component close to the fixed toner discharge plate, and FIG. 19 is a three-dimensional view of the guide component. As shown in FIGS. 14 and 17 to 19, the guide component 231 may include a guide rail 231*c* including a first end component 231*a* and a second end component 231*b*. When the toner cartridge is installed, the connection component 11*b* of the electronic imaging device may move from the first end component 231*a* to the second end component 231*b* along the guide rail 231*c*.

In this embodiment, the toner discharge structure 230 may further include a first force receiving block 234. The first force receiving block 234 may be connected to the guide component 231 and located at the upper portion of the second end component 231*b*. The first force receiving block 234 may be used to cooperate with the connection component 11*b*, such that the connection component 11*b* and the first force receiving block 234 may abut and push the entire guide component 231 to move with the installation of the toner toner cartridge and the movement of the connection component 11*b*, when the toner cartridge is installed in the electronic imaging device in the second direction. The guide component 231 may be driven to move in the opposite direction to the second direction, that is, to move from a direction away from the connection portion 260 to a direction close to the connection portion 260 (−X direction in FIG. 14).

Further, the fixed toner discharge plate 280 may include a rail 284, an abutment block 285, an anti-separation block 286, and a balance block 287. Preferably, a chamfer 285*a* may be further provided at one end of the abutment block 285 close to the anti-separation block 286. The guide component 231 may further include an auxiliary guide rail 231*e* located on the same side as the guide rail 231*c* of the guide component 231 and cooperate with each other, to assist the connection component 11*b* to move more smoothly on the guide rail 231*c* of the guide component 231. The guide component 231 may further include a matching piece 231*g*, a first auxiliary block 231*f* and a second auxiliary block 231*i*. The matching piece 231*g*, the first auxiliary block 231*f* and the second auxiliary block 231*i* may be all disposed on a side of the guide component 231 facing away from the auxiliary guide rail 231*e* and the guide rail 231*c*. The matching piece 231*g* may have an "I"-shaped structure, and may be installed in the rail 284. The first auxiliary block 231*f* may be installed on the upper portion of the abutment block 285 in the vertical direction, and the second auxiliary block 231*i* may be installed above the balance block 287. The first auxiliary block 231*f*, the second auxiliary block 231*i* and the "I"-shaped matching piece 231*g* may work together to ensure that the guide component 231 moves as smoothly as possible to reduce shaking.

The toner discharge structure 230 may further include a locking component 232 and an elastic member 233. The locking component 232 may be movably disposed on the guide component 231. The locking component 232 may have an unlocking position and a locking position on the guide component 231. When the locking component 232 moves with the guiding member 231 along a direction opposite to the second direction (−X direction in FIG. 14), the locking component 232 may protrude from the guide component 231 to limit the connection component 11*b*. At this time, the locking component 232 may reach at its locking position. The elastic member 233 may be arranged between the locking component 232 and the guide component 231 to act on the locking component 232. When the locking component 232 moves with the guiding member 231 along the second direction, the elastic member 233 may act on the locking component 232 to make the locking component 232 retracted, to release the limitation of the connection component 11*b*. At this time, the locking component 232 may reach its unlocking position. Further, a gap 231*d* may be provided on another side of the first force receiving block 234 which is install place relative to the connection component 11*b*, such that the locking component 232 is able to pass through the gap 231*d*.

Figure 20:
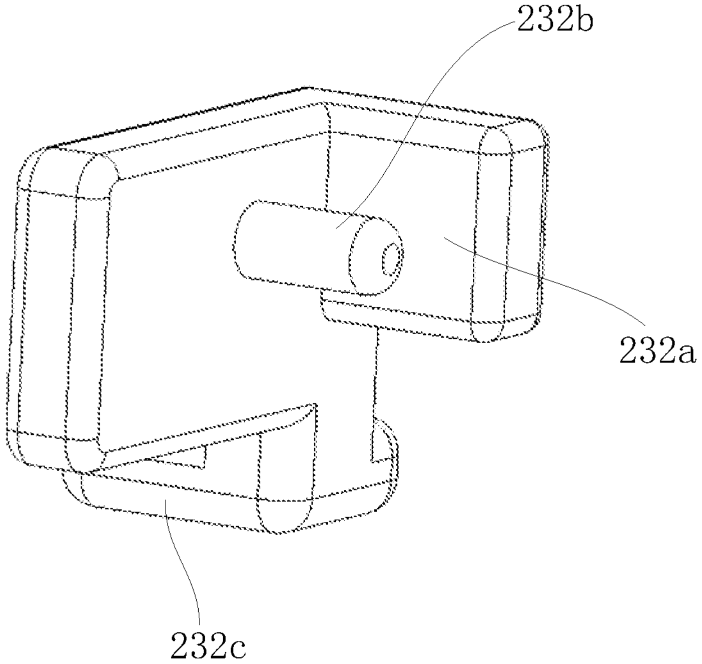
FIG. 20 and FIG. 21 illustrate three-dimensional structure of a locking component from different view angles according to Embodiment 3 of the present disclosure.
Figure 21:
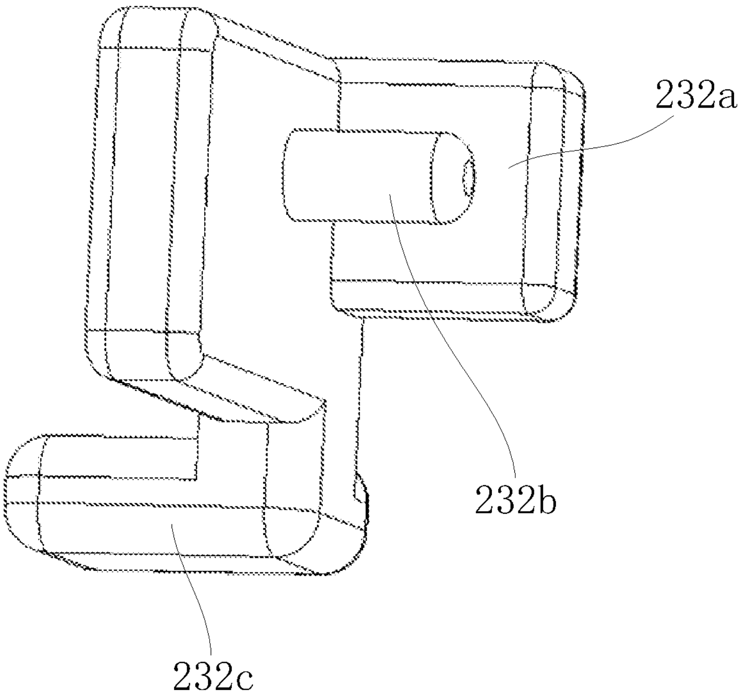

FIG. 20 and FIG. 21 are three-dimensional views of the locking component from different perspectives. The locking component 232 may include a stable portion 232*c* and a second force-receiving block 232*a*. The second force-receiving block 232*a* may be connected to the stable portion 232*c*. When the locking component 232 moves along with the guide component 231 in a direction opposite to the second direction, the stable portion 232*c* may be abutted and interfere the stable portion 232*c*, to make the second force-receiving block 232*a* protrude from the gap 231*d* to be in contact with the connection component 11*b* of the electronic imaging device and receive force.

Further, a first fixing portion 231*h* for fixing one end of the elastic member 233 may be further provided on the back of the guide component 231. Preferably, in one embodiment, the first fixing portion 231*h* may be a hole that does not penetrate through the guide member 231. The locking component 232 may further include a second fixing portion 232*b* for fixing another end of the elastic member 233. Preferably, in one embodiment the second fixing portion 232*b* may be a protruding column connected to the stabilizing portion 232*c*, and the elastic member 233 may be a compression spring. During assembly, one end of the elastic member 233 may be sleeved on the second fixing portion 232*b*, and another end of the elastic member 233 may be positioned at the first fixing portion 231*h*, to limit the position of the elastic member 233. That is, the elastic member 233 may be set between the stabilizing portion 232*c* and the guide component 231.

To prevent the locking component 232 from being displaced in the second direction together with the guide component 231, the stabilizing portion 232*c* may be be inserted into the groove of the "I" fitting piece 231*g*, such that the locking component 232 and the guide component 231 are prevented from relative movement as much as possible.

Figure 22:
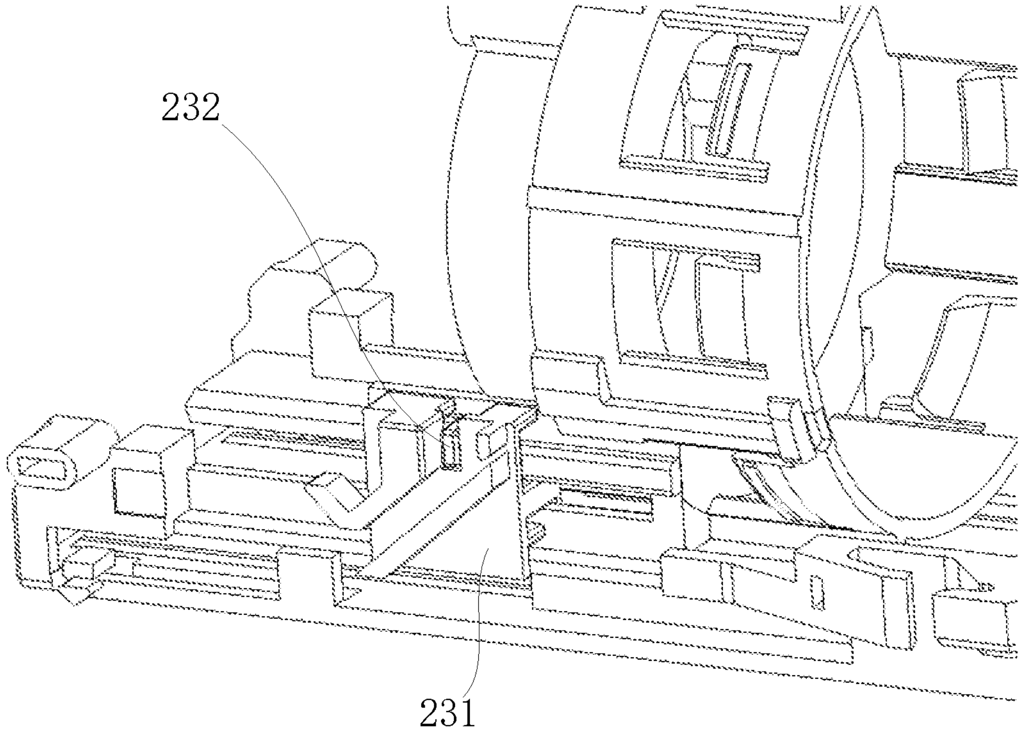
FIG. 22 illustrates a structure of a toner discharge structure before the toner cartridge is installed in the electronic imaging device, according to Embodiment 3 of the present disclosure.
Figure 23:
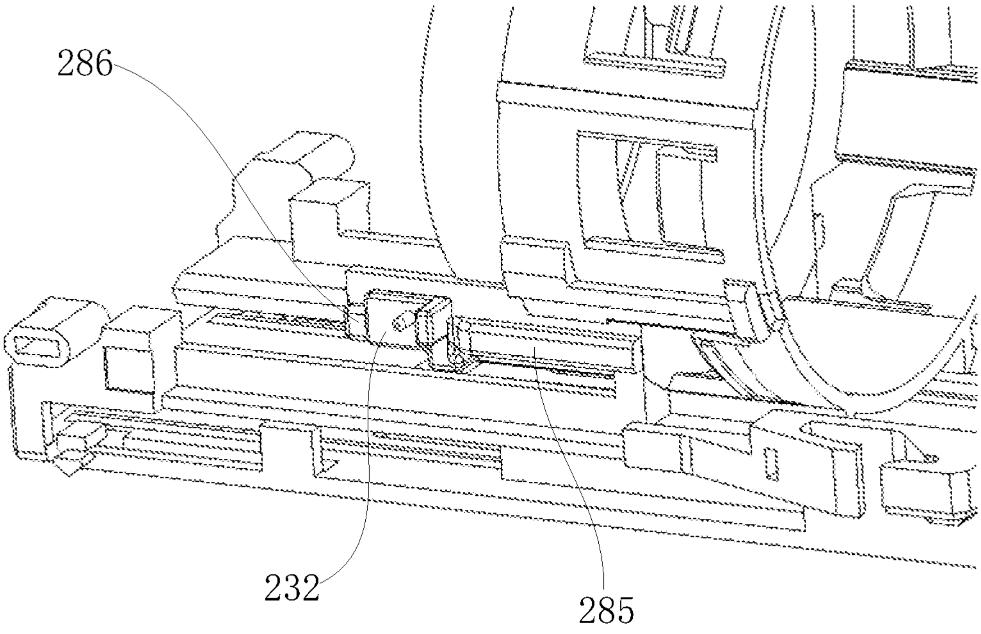
FIG. 23 illustrates an inner structure of FIG. 22 after removing the guide component.
Figure 24:
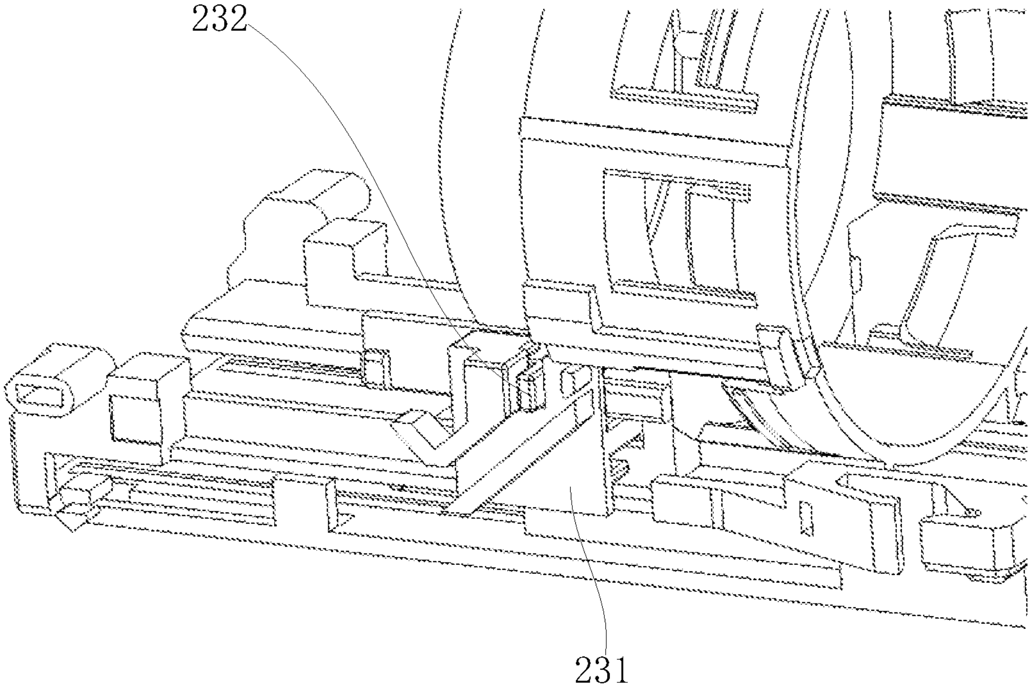
FIG. 24 illustrates a structure of the toner discharge structure after the toner cartridge is installed in the electronic imaging device at right position, according to Embodiment 3 of the present disclosure.
Figure 25:
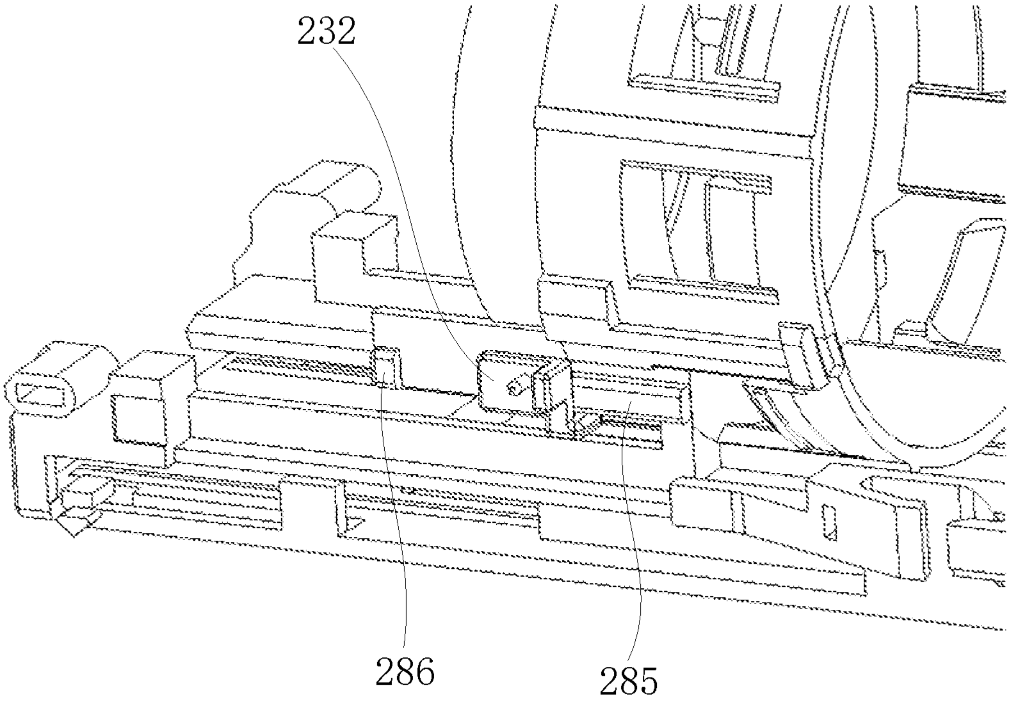
FIG. 25 illustrates an inner structure of FIG. 24 after removing the guide component.

FIG. 22 is a schematic view of the toner discharge structure before the toner cartridge is installed in the electronic imaging device, FIG. 23 is a schematic view of the internal structure of FIG. 22 with the guide component removed, FIG. 24 is a schematic view of the toner discharge structure when the toner cartridge is installed in the electronic imaging device, FIG. 25 is a schematic view of the internal structure FIG. 24 with the guide component removed. As shown in FIG. 22 and FIG. 23, before the toner cartridge is installed in the electronic imaging device, the locking component 232 may be located between the anti-separation block 286 and the abutment block 285, and the locking component 232 may not protrude relative to the guide piece 231. During the installation process, the connection component 11*b* of the electronic imaging device may move along the first end component 231*a* of the guide component 231 toward the second end component 231*b*. Afterwards, the connection component 11*b* may abut against the first force receiving block 231*c* and drive the entire guide member 231 and the locking component 232 to move along the rail 284. Because the contact and interference between the locking component 232 and the abutment block 285, the second force receiving block 232*a* may gradually protrude from the gap 231*d*, and the elastic member 233 may become a compressed state. When the installation of the toner cartridge is completed, the connection component 11*b* may move to the installation position set by the electronic imaging device, and become the state shown in FIG. 24 and FIG. 25. At this time, similar to Embodiment 1, the discharge channel may be formed at the plane passing through the second end component 231*b* of the guide rail and perpendicular to the rotation axis, allowing the developer in the toner cartridge to flow into the electronic imaging device. Therefore, the toner cartridge can work normally. When the toner cartridge needs to be taken out after the work is completed, the connection component 11*b* may abut against the second force receiving block 232*a* and move along the rail 284 in a direction opposite to the second direction (installation direction) to drive the guide component 231 and the locking component 232 to move together, until the position shown in FIG. 22 and FIG. 23 is reached. Then, the locking component 232 may no longer contact and interfere with the abutment block 285, and the elastic piece 233 may push the second force-bearing block 232*a* to retract from the gap 231*d* due to the release of elastic potential energy to not contact with the connection component 11*b*. Then, the connection component 11*b* may move along the second end component 231*b* of the guide rail 231 to the first end component 231*a*, to complete the disengagement of the connection component 11*b* during the process of taking out the toner cartridge.

Embodiment 4

Figure 26A:
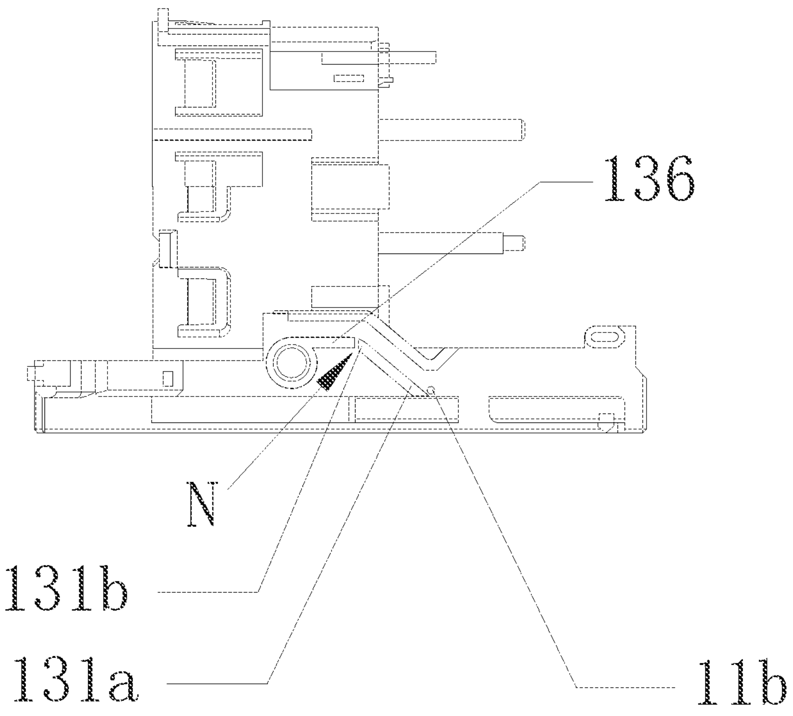
FIG. 26*a* illustrates a side structure of a toner discharge structure according to Embodiment 4 of the present disclosure.
Figure 26B:
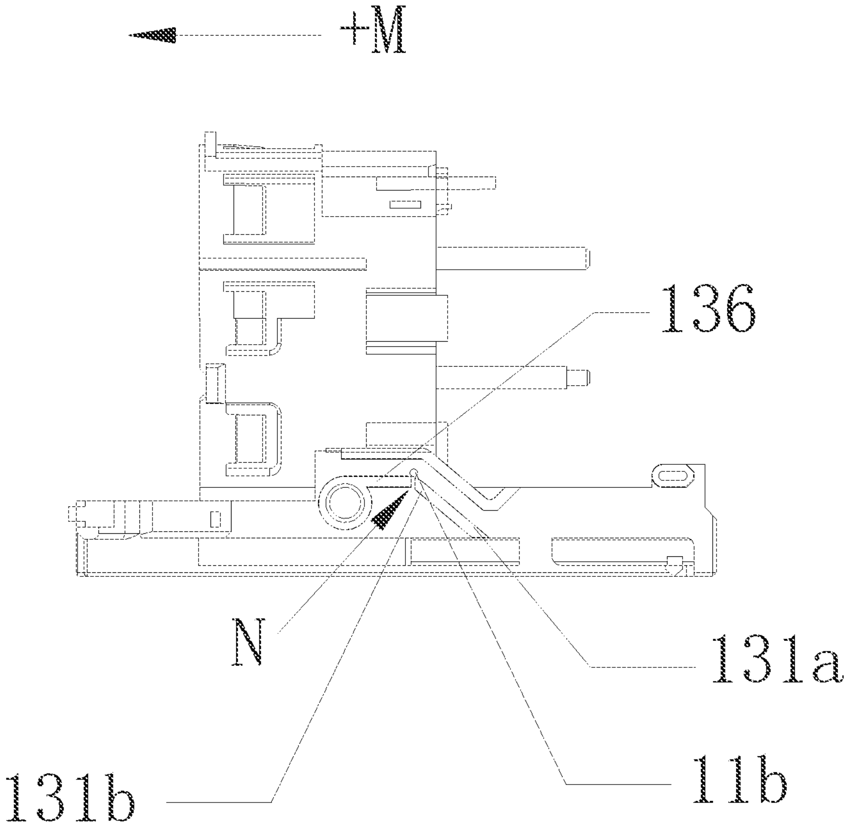
FIG. 26*b* illustrates another side structure of a toner discharge structure according to Embodiment 4 of the present disclosure.
Figure 26C:
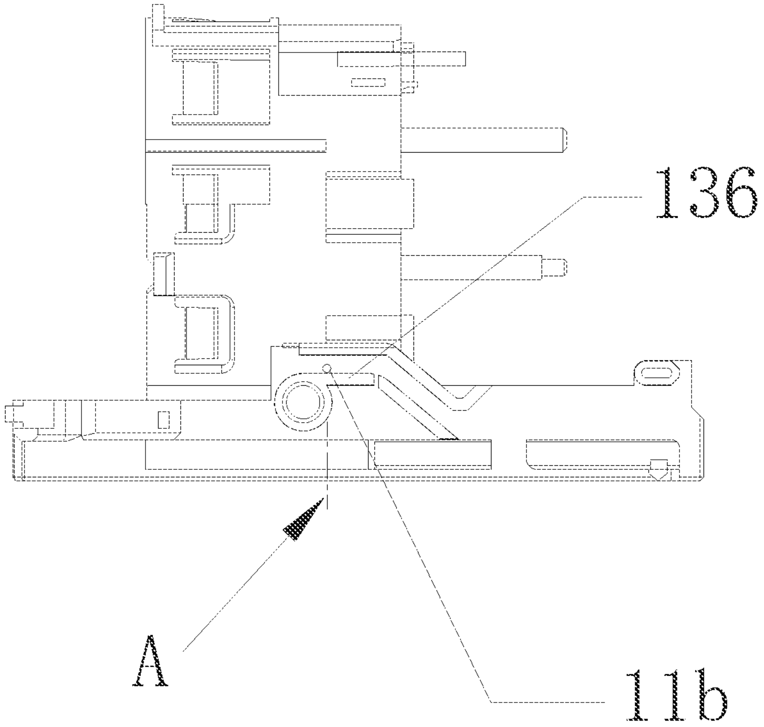
FIG. 26*c* illustrates another side structure of a toner discharge structure according to Embodiment 4 of the present disclosure.
Figure 27A:
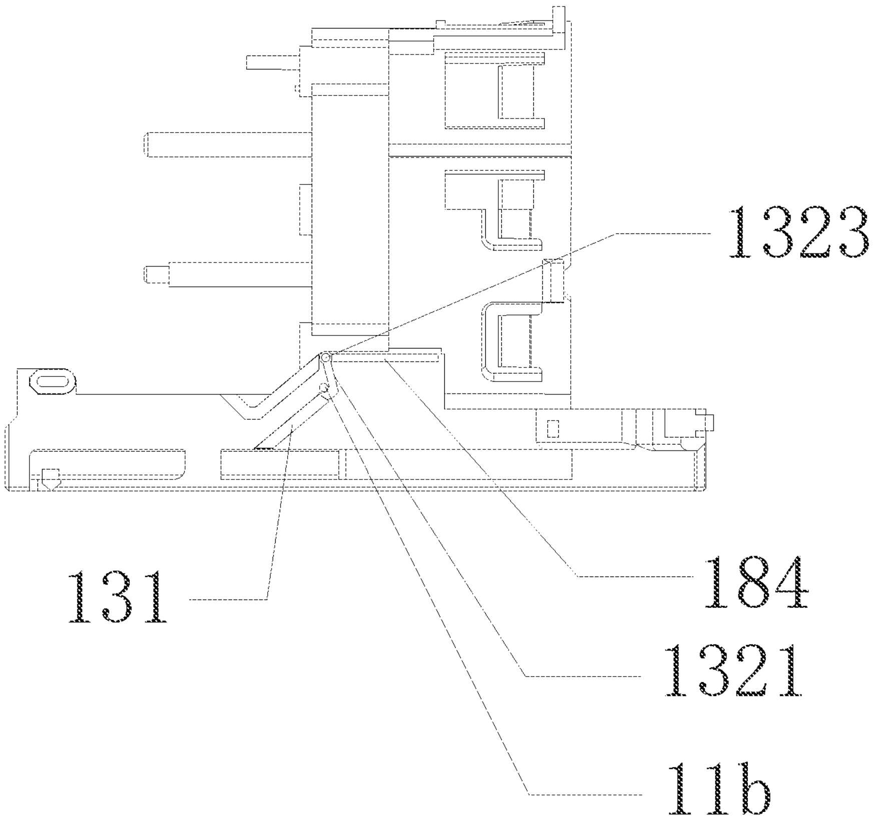
FIG. 27*a* illustrates a side structure of a toner discharge structure according to Embodiment 5 of the present disclosure.
Figure 27B:
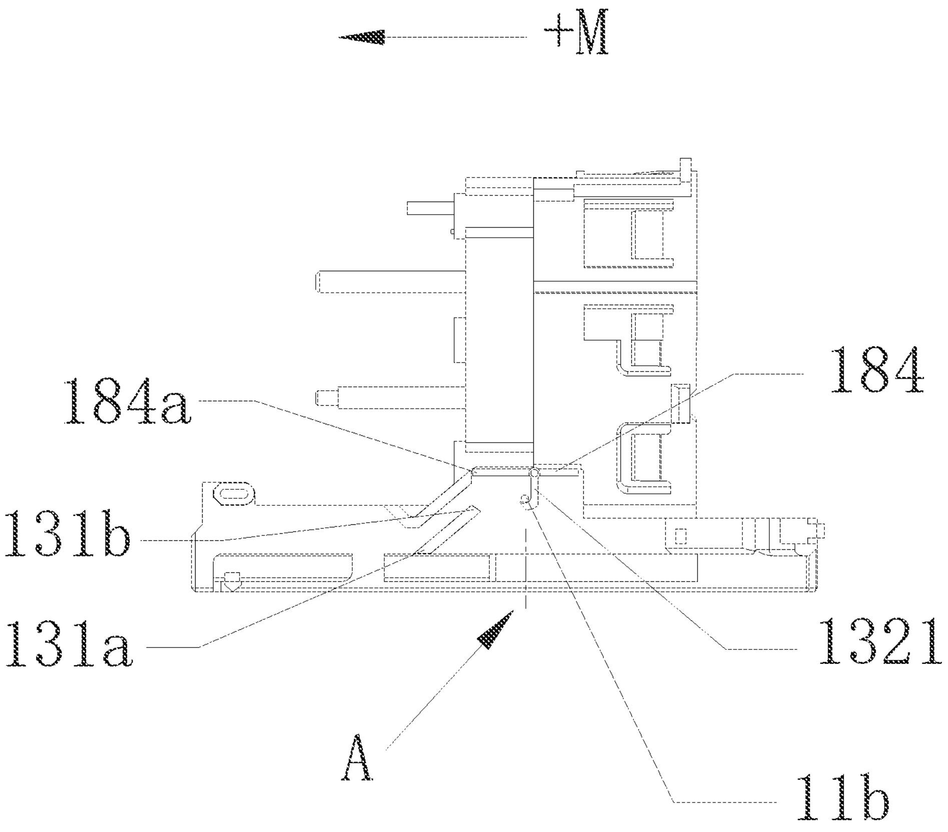
FIG. 27*b* illustrates another side structure of a toner discharge structure according to Embodiment 5 of the present disclosure.

As shown in FIGS. 26*a* to 26*c*, on the basis of Embodiment 2, in this embodiment, the holding component 136 may be set to a plane structure. Specifically, the holding component 136 may be disposed on the sidewall of the fixed toner discharge plate 180 and extend in the second direction (installation direction). The second direction may be parallel to the direction in which the rotation axis of the toner cartridge extends. Therefore, there may be no change in the distance of the holding component 136 relative to the rotation axis of the toner cartridge. Specifically, the holding component 136 may be also provided outside the guide component 131, and the holding component 136 may be an independent part spaced apart from the second end component 131*b* of the guide component 131. That is, the holding component 136 and the second end component 131 *b* of the guide component 131 may be arranged at intervals. Different from Embodiment 2, the slope of the guide component of the 131 in this embodiment may be increased relative to that of Embodiment 2, and the size of the gap N between the holding component 132 and the guide component 131 may be smaller than the maximum diameter of the connection component 11*b* (when the connection component 11*b* is a cylinder, it is larger than the diameter of the cross section of the cylinder), such that the connection component 11*b* is able to cross the gap between the holding component 136 and the second end component 131*b* of the guide component 131 and stay on the holding component 136 under the action of the insertion force of the toner cartridge installation. That is, in comparison to Embodiment 2, in this embodiment, after the connection component 11*b* gradually rises along the first end component 131*a* of the guide component 131 to the second end component 131*b* and is no longer clamped at the gap N between the holding component 136 and the guide component 131, the toner cartridge may not be inserted into the final position and continue to follow the arrow+M direction (installation direction, opposite to the second direction) under the action of the insertion force (a manual force given by a user), and the size of the gap N may be smaller than the diameter of the connection component 11*b*. Therefore, the connection component 11*b* may be able to completely cross the gap N and reach the holding component 136. After the connection component 11*b* reaches the holding component 136, the connection component 11*b* may stay directly on the holding component 136 as the toner cartridge is installed in place, that is, the connection component 11*b* may not move relative to the holding component 136. Or the connection component 11*b* may stay on the connection component 136 after moving for a certain distance on the connection component 136, to keep the opening state of the receiving port 11*a*. These two methods can be adjusted according to the slope of the guide component 131. When the connection component 11*b* is at the final position on the holding component 136, the toner outlet hole on the movable toner discharge plate 190 of the toner cartridge may coincide with the toner outlet port 140 to form the discharge channel. The center line A in FIG. 26*c* indicates the centerline of the discharge channel where the toner is discharged from the toner cartridge.

Embodiment 5

As shown in FIGS. 27*a*-28*b*, in this embodiment, the holding component may be set as a movable structure. The holding component 1321 may be movably arranged on the side wall of the fixed toner discharge plate 180, and the moving method of the holding component 1321 may be translation. Specifically, a guide post 1323 may be set on the holding component 1321, and a guide groove 184 matching the guide post 1323 may be set on the side wall of the fixed toner plate 180, such that the holding component 1321 is able to move along the guide groove 184. The guide groove 184 may extend in the second direction. The second direction is parallel to the extending direction of the rotation axis of the toner cartridge, and the holding component 1321 may translate in the guide groove. That is, there may be no distance change of the holding component 1321 relative to the rotation axis of the toner cartridge. During the installation of the toner cartridge in the electronic imaging device, the connection component 11*b* may climb from the first end component 131*a* to the second end component 131*b* of the guide component 131 and then remain on the holding component 1321. The holding component 1321 may be in the initial position (a position abutting against the outer side of the second end component 131*b*) to receive the connection component 11*b* guided by the guide component 131. The connection component 11*b* and the holding component 1321 supporting the connection component 11*b* may move in the guide groove 184 along the second direction with the insertion force of the cartridge installation in the +M direction. As shown in FIG. 27*b*, finally, when the connection component 11*b* is at the final position on the holding component 1321, the toner outlet hole on the movable toner discharge plate 190 of the toner cartridge may coincide with the toner outlet port 140 and the discharge channel may be formed. The center line A in FIG. 26*c* indicates the centerline of the discharge channel where the toner is discharged from the toner cartridge.

Figure 28A:
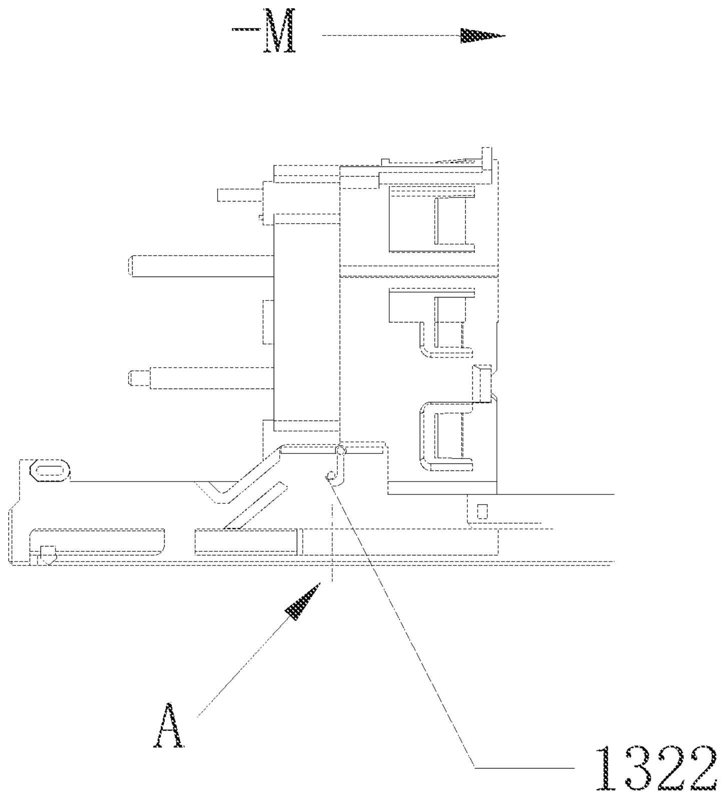
FIG. 28*a* illustrates a side structure of a toner discharge structure according to Embodiment 5 of the present disclosure.

Further, as shown in FIG. 28*a*, the holding component 1321 may be also provided with an abutting surface 1322. When the toner cartridge moves in the direction of arrow-M (opposite to the installation direction) to be taken out from the electronic imaging device, the connection component 11*b* and the holding component 1321 receiving the connection component 11*b* may move in the guide groove 184. Finally, as shown in FIG. 28*a*, an abutting surface 1322 may be provided on the holding component 1321 that is able to abut against the connection component 11*b*, and the holding component may be driven by the abutment between the abutting surfaces 1321 and 1322 to move relative to the guide groove 184 in the +M direction.

Figure 28B:
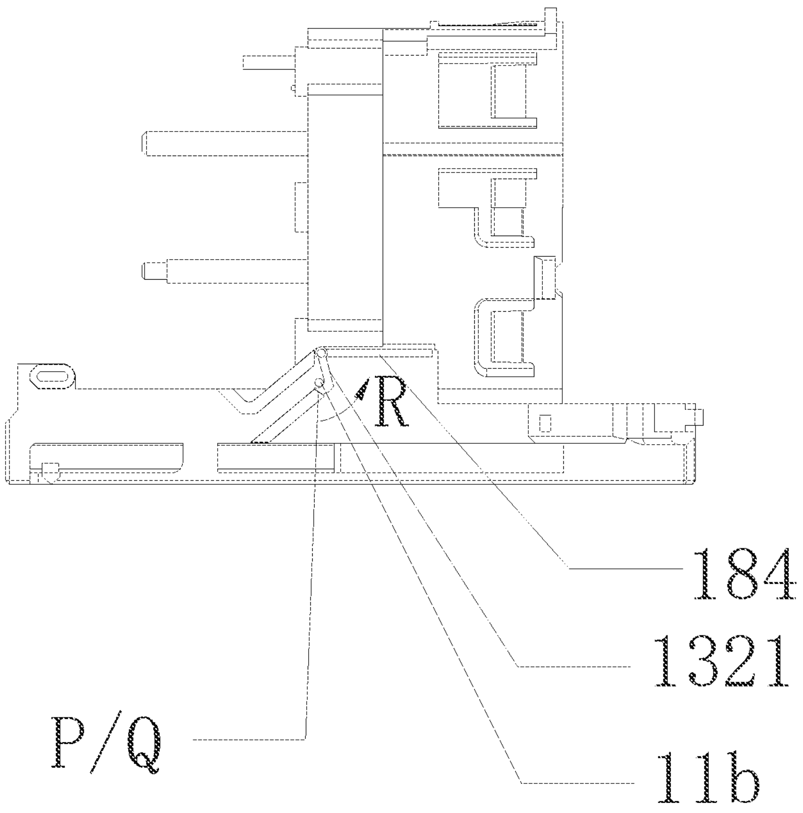
FIG. 28*b* illustrates another side structure of a toner discharge structure according to Embodiment 5 of the present disclosure.

When the toner cartridge continues to be taken out, the holding component 1321 carrying the connection component 11*b* may reach the second end component 131*b* in the guide groove 184. As shown in FIG. 28*b*, a first end component 184*a* of the guide groove 184 and the second end component 131*b* of the guide component 131 may be set to be further away from the toner outlet 140 in the direction parallel to the rotation axis. Therefore, when the holding component 1321 moves to the first end component 184*a* of the guide groove 184, it may interfere with the second end component 131*b*. It is preferable to set an outward inclined plane Q of the holding component 1321 opposite to the abutting plane 1322 to abut against an inclined surface P of the second end component 131*b*, and the two inclined planes may move relative to each other. Under the guidance of the contact movement of the two inclined planes, the holding component 1321 may be rotated on the toner cartridge with the guide post 1323 as the rotation axis, until the abutting plane 1322 cooperates with the second end component 131*b* to "send" the connection component 11*b* to the second end component 131*b* without interference. The rotation direction is indicated by the arrow R. After that, the inclined plane Q of the holing portion 1321 may continue to overlap on the inclined plane P of the second end component 131*b*, such that the holding component 1321 maintains the rotated posture to receive the connection component 11*b* rising from the second end component 131*b* without interference when the toner cartridge is installed next time.

Embodiment 6

Figure 29A:
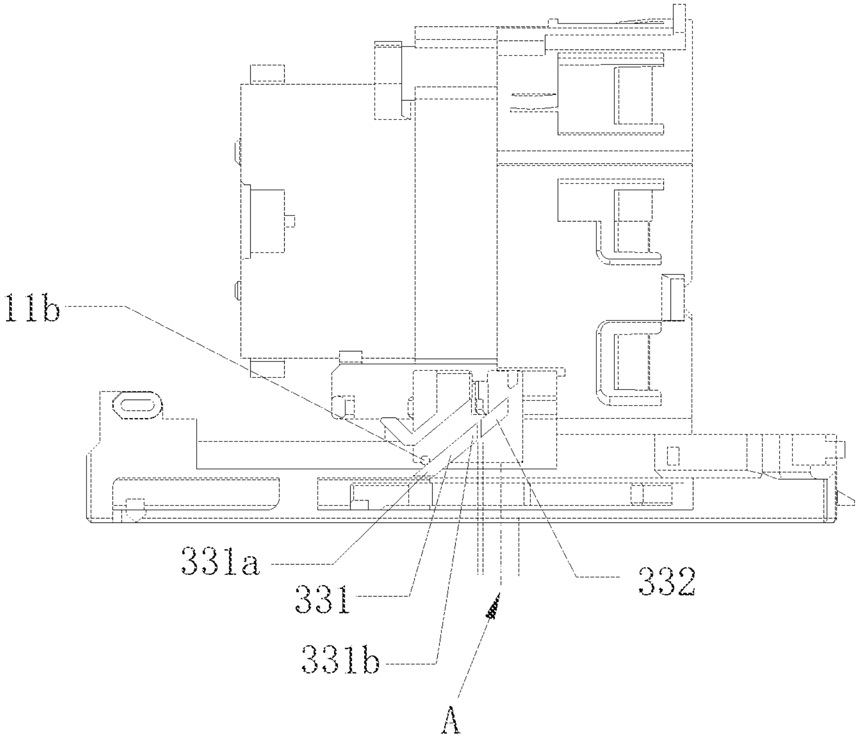
FIG. 29*a* illustrates a side structure of a toner discharge structure according to Embodiment 6 of the present disclosure.
Figure 29B:
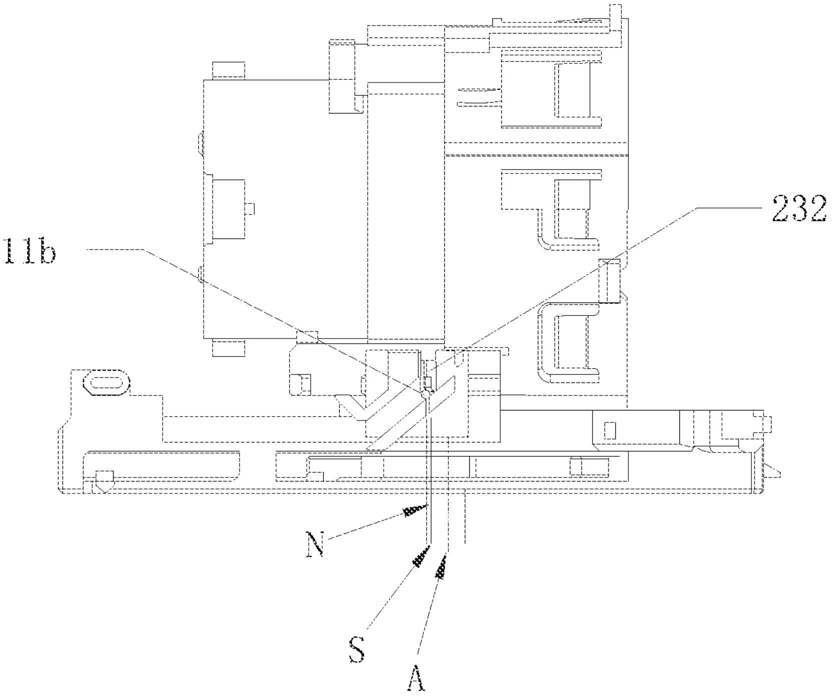
FIG. 29*b* illustrates another side structure of a toner discharge structure according to Embodiment 6 of the present disclosure.
Figure 29C:
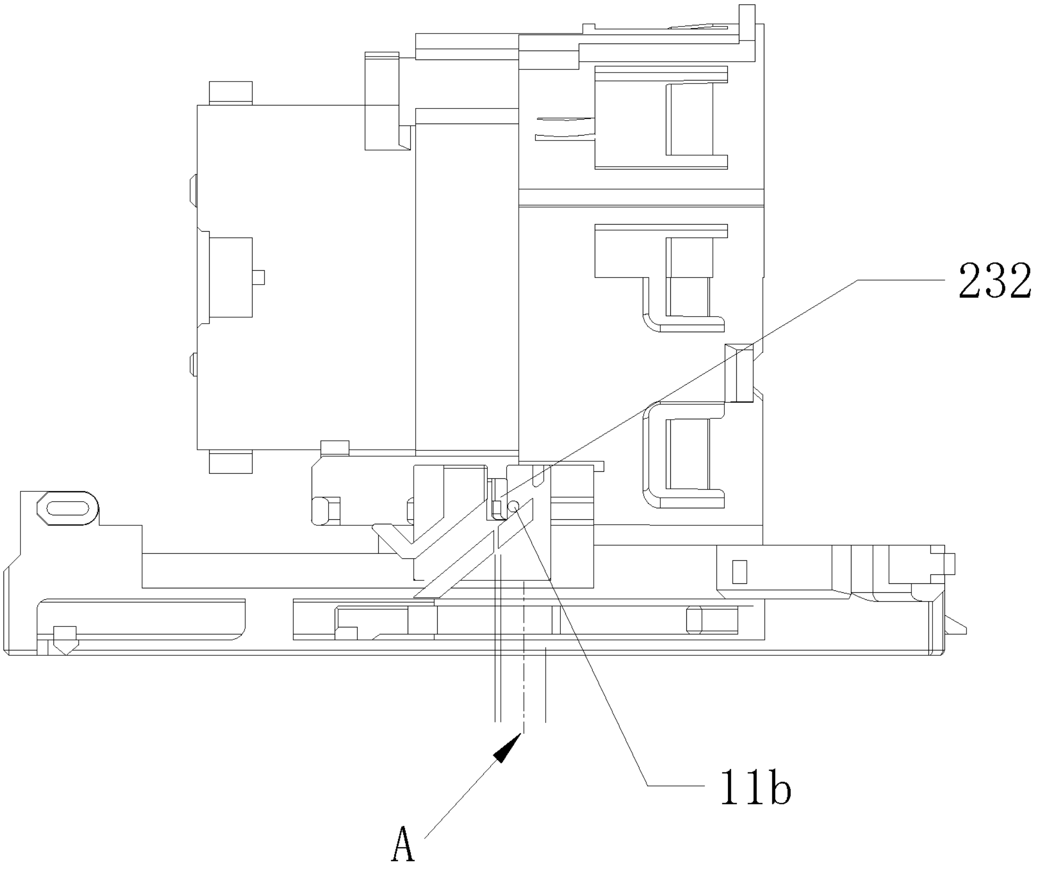
FIG. 29*c* illustrates another side structure of a toner discharge structure according to Embodiment 6 of the present disclosure.
Figure 30:
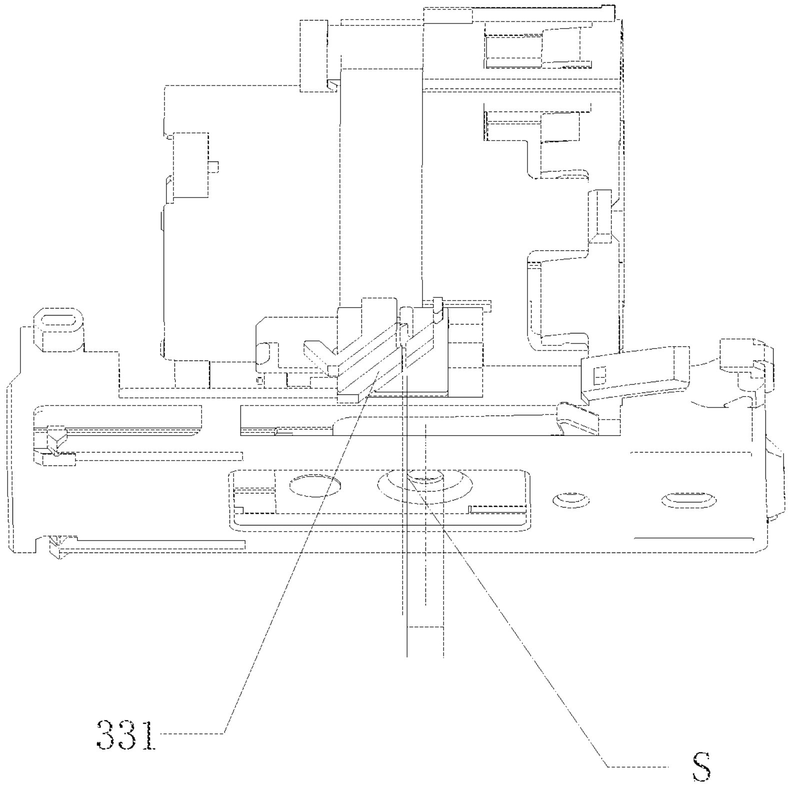
FIG. 30 illustrates a toner discharge structure according to Embodiment 6 of the present disclosure.

As shown in FIGS. 29*a* to 30, in this embodiment, on the basis of Embodiment 3, the guide component 231 shown in Embodiment 3 may be further divided into two parts: a guide component 331 and a holding component 332. There may be a gap N of the same size as Embodiment 4 between the guide component 331 and the holding component 332. That is, the size of the gap N may be smaller than the maximum diameter of the connection component 11*b*. Different from Embodiment 3, the guide component 331 may have a larger slope than the guide component 331 in Embodiment 3.

The guide component 231 shown in Embodiment 3 may be further divided into two parts including the guide component 331 and the holding component 332. The guide component 331 may also include a first end component 331*a* and a second end component 331*b*. As shown in FIG. 29*a*, initially, when the connection component 11*b* climbs from the first end component 331*a* to the second end component 331*b* and reaches the gap N (as shown in FIG. 29*b*), since the size of the gap N is smaller than the diameter of connection component 11*b*, under the action of the insertion force of the installation of the toner cartridge, the connection component 11*b* may be able to completely cross the gap N to reach the holding component 332 (same as in Embodiment 4). After reaching the holding component 332, the second force receiving block 232*a* of the locking component 232 may protrude from the gap 231*d* at a time node and in a manner similar to Embodiment 3, to block the connection component 11*b* from sliding down (as shown in FIG. 29*c*).

It should be noted that in this embodiment, the position of the gap N located between the guide component 331 and the holding component 332 may be that the gap Nis further away from the toner outlet 140 than the discharge channel (the center line in FIG. 29*c*), in the direction parallel to the rotation axis of the toner cartridge. Since the gap N is actually the end of the guide component 331, when the connection component 11*b* is located at a position where it participates in the formation of the discharge channel to discharge the toner out of the toner cartridge, the connection component 11*b* may not be located on the guide component 331. This is the purpose of this embodiment. That is, when a plane (a line S in FIG. 29*b*) is perpendicular to the rotation axis and passes through the discharge channel, the plane may not pass through the guide component 331. In the figure, the gap N is located outside the line S, and in the direction parallel to the rotation axis of the toner cartridge, the gap N may be further away from the toner outlet 140 relative to the line S. When the gap N has different widths in the direction perpendicular to the rotation axis, it is preferable that the minimum width of the gap N is located outside the line S and far from the toner outlet/the cartridge body 120 relative to the line S.

Embodiment 7

Figure 31:
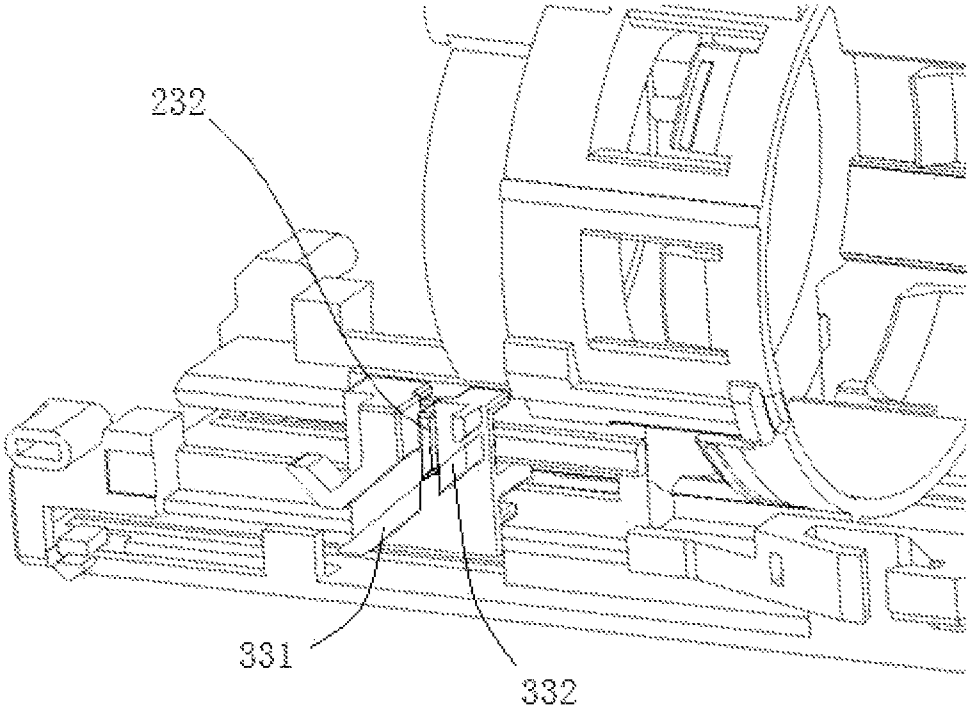
FIG. 31 illustrates a toner discharge structure according to Embodiment 7 of the present disclosure.
Figure 32:
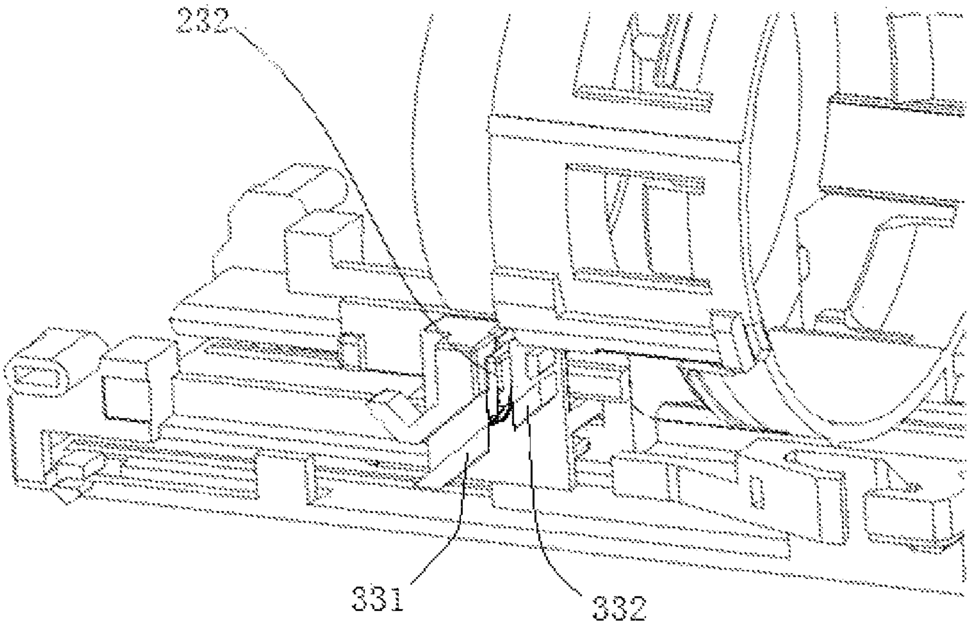
FIG. 32 illustrates another toner discharge structure according to Embodiment 7 of the present disclosure.

As shown in FIGS. 31 and 32, on the basis of Embodiment 6, the locking component 232 may protrude through the gap 231*d*, and at least a portion of the locking component 232 close to the bottom of the toner cartridge in the vertical direction (the first direction) may also be located at the gap N between the guide component 331 and the holding component 332, such that the gap N may be filled when the locking component 232 protrudes. There may be basically no gap between the locking component 232 and the holding component 322 when the connection component 11*b* climbs to the holding component 332. Therefore, there may not be a phenomenon that the connection component 11*b* slips down from the gap because of the appearance of the undesired gap caused by tolerances, shaking and the like.

Embodiment 8

Figure 33:
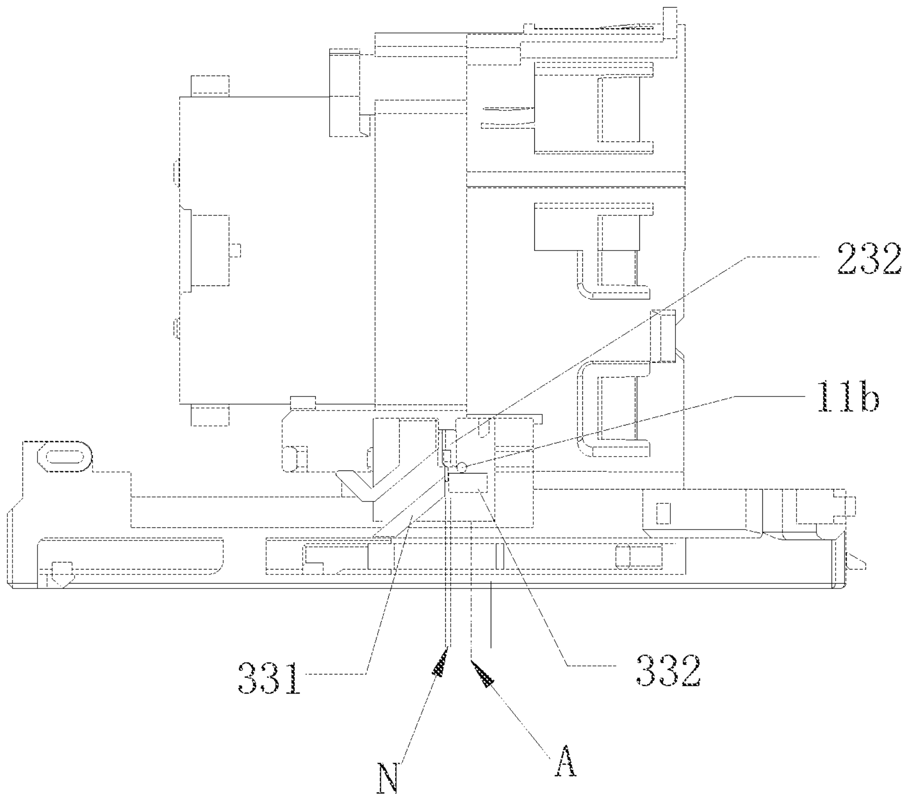
FIG. 33 illustrates a side structure of a toner discharge structure according to Embodiment 8 of the present disclosure.

As shown in FIG. 33, Embodiment 6, Embodiment 4, and Embodiment 7, in this embodiment, on the basis of Embodiment 6, it is preferable to set the holding component 332 as a planar structure (Embodiment 4). That is, the holding component 332 may extend along the second direction. The second direction may be parallel to the direction in which the rotation axis of the toner cartridge extends, such that there is no change in the distance of the holding component 332 relative to the rotation axis of the toner cartridge.

Further, when the locking component 232 protrudes out from the gap 231*d*, the gap N between the guide component 331 and the holding component 332 may also be filled up (Embodiment 7). Therefore, there may not be a phenomenon that the connection component 11*b* slips down from the gap because of the appearance of the undesired gap caused by tolerances, shaking and the like.

Embodiment 9

Figure 34A:
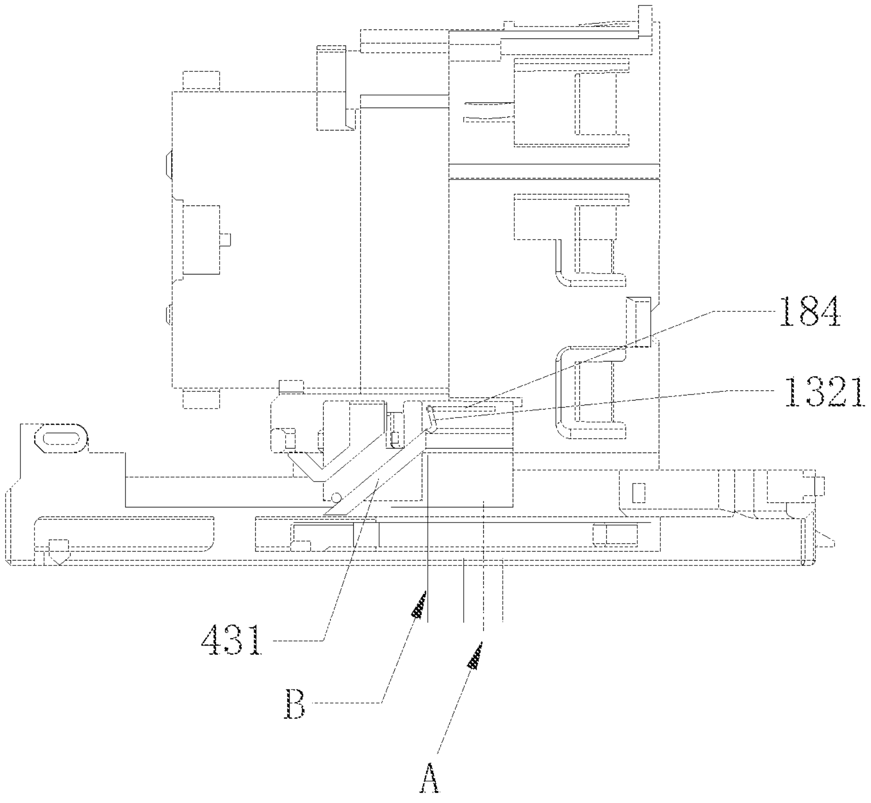
FIG. 34*a* illustrates a side structure of a toner discharge structure according to Embodiment 9 of the present disclosure.
Figure 34B:
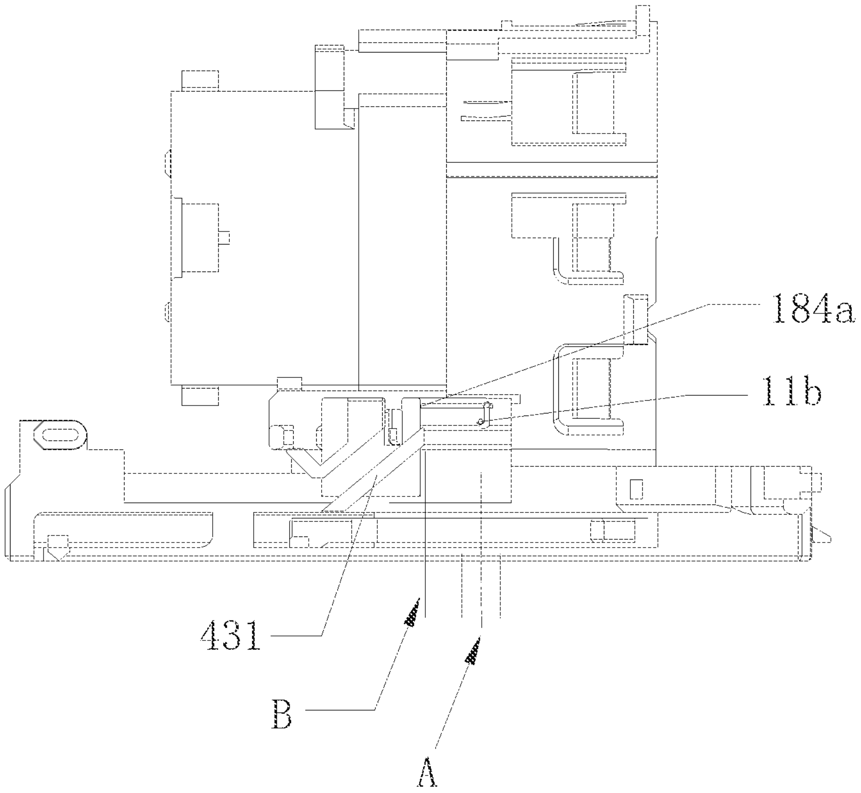
FIG. 34*b* illustrates another side structure of a toner discharge structure according to Embodiment 9 of the present disclosure.
Figure 35:
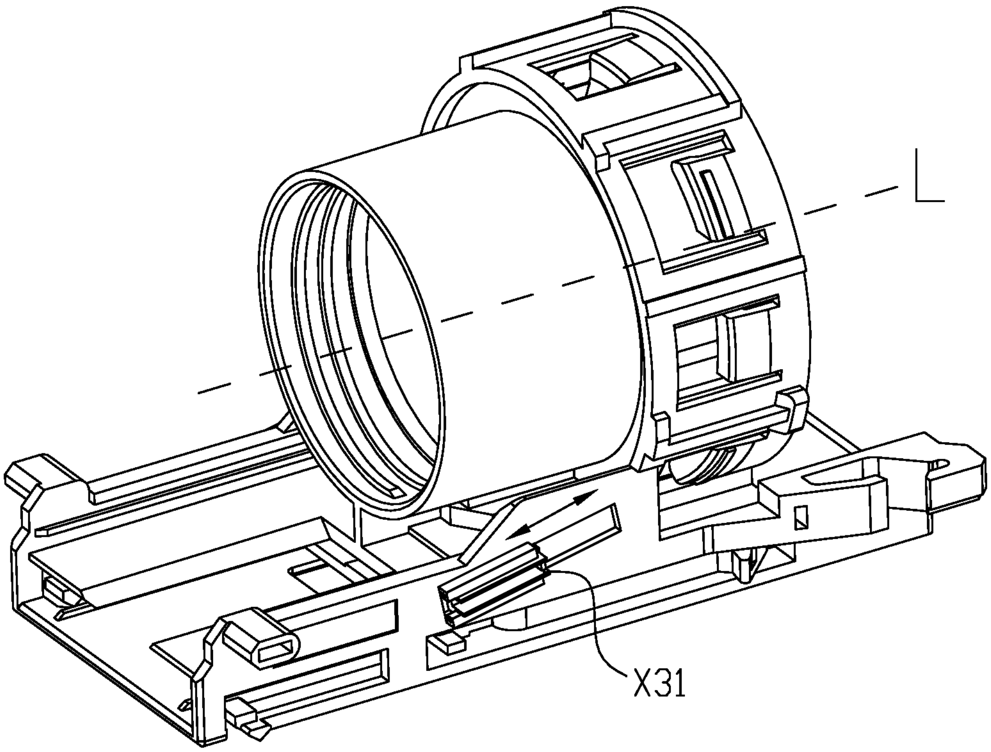
FIG. 35 illustrates a toner discharge structure according to Embodiment 10 of the present disclosure.
Figure 36:
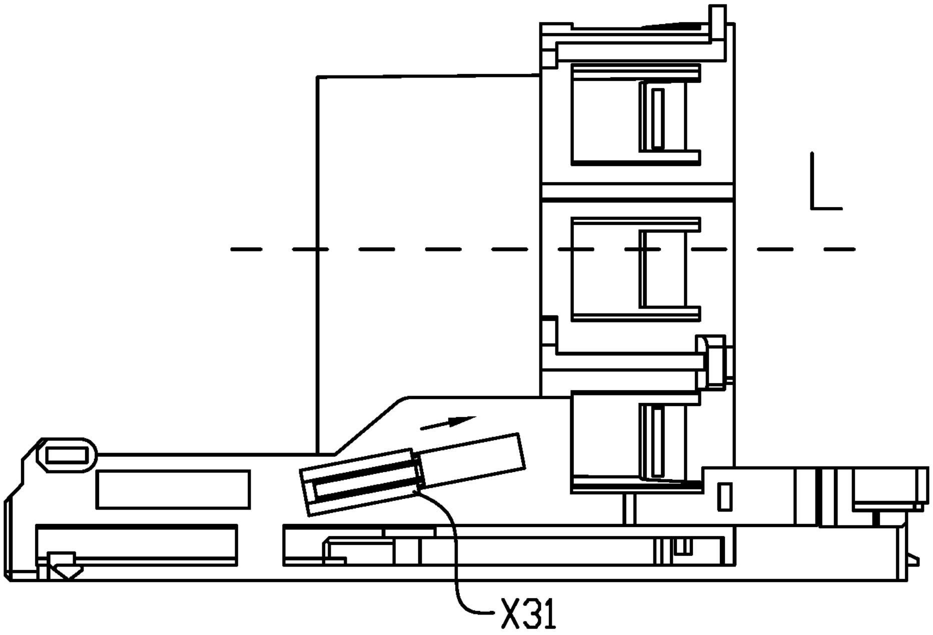
FIG. 36 illustrates a side structure of a toner discharge structure according to Embodiment 10 of the present disclosure.
Figure 37:
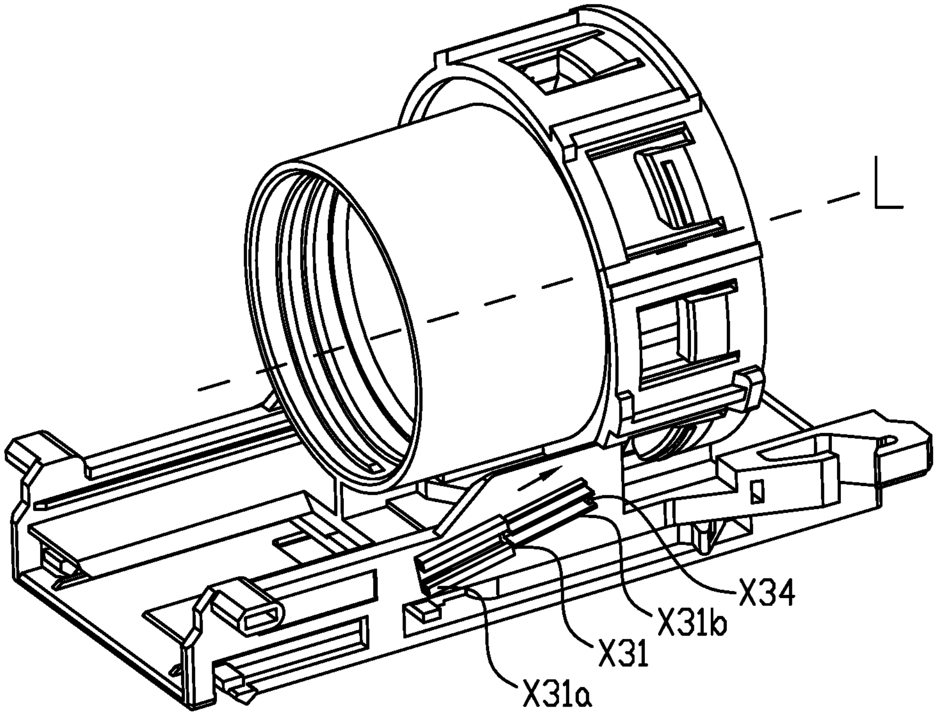
FIG. 37 illustrates a toner discharge structure according to Embodiment 10 of the present disclosure.
Figure 38:
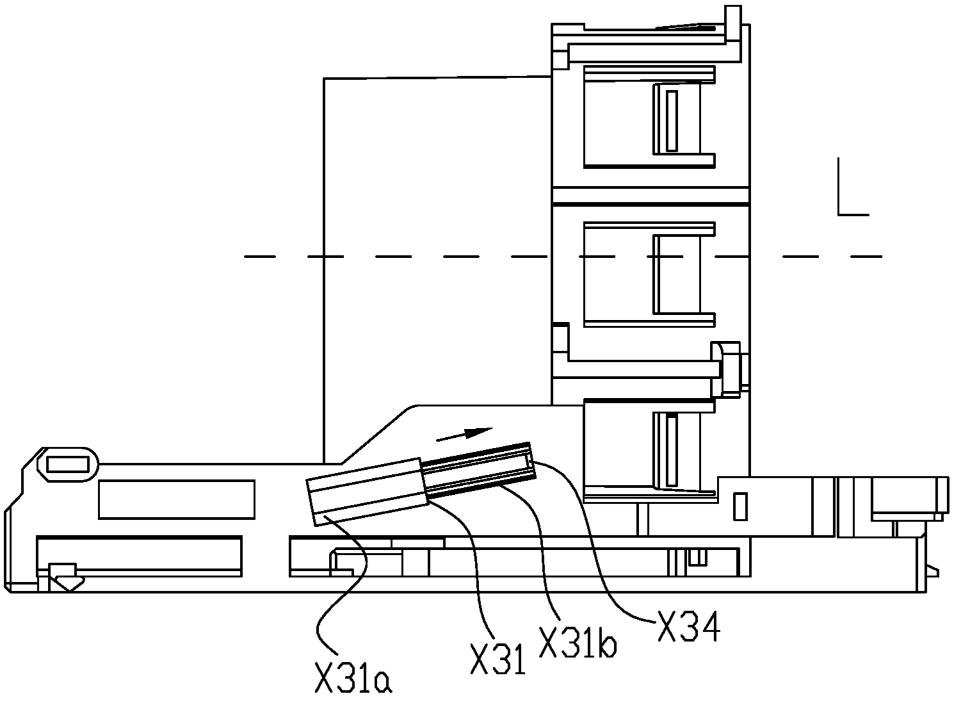
FIG. 38 illustrates a side structure of a toner discharge structure according to Embodiment 10 of the present disclosure.
Figure 39:
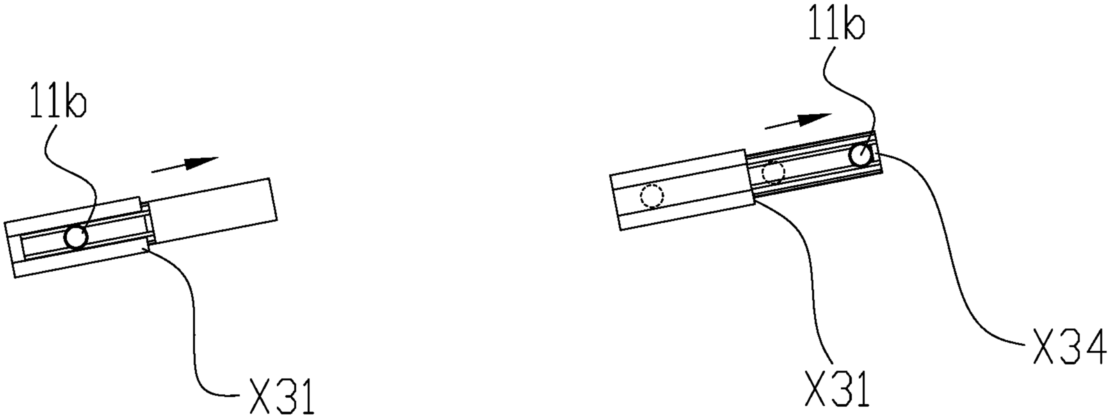
FIG. 39 illustrates a guide component according to Embodiment 10 of the present disclosure.

As shown in FIGS. 34*a* to 34*b*, on the basis of Embodiment 3, this embodiment may combine the movable holding component in Embodiment 5. That is, in this embodiment, the movable guide component 431 may be combined with the movable holding component 1321. Different from Embodiment 3, the guide component 431 may only be able to move to a predetermined position (the position B in FIG. 34*a*), and then the movable holding component 1321 may receive the connection component 11*b* (the part of the holding component 1321 is the same as that in Embodiment 5). The movable range of the guide component 431 may be shorter than that of Embodiment 3, but the shortening position is not particularly limited. In this embodiment, since the holding component 1321 has a movable range, when the connection component 11*b* is located at a position for participating in the formation of the discharge channel to discharge the toner of the toner cartridge, the connection component 11*b* may not be positioned on the guide component 431. That is, when a plane is perpendicular to the rotation axis and passes through the discharge channel, the plane may not pass through the guide component 431.

Further, it should be noted that the locking component 232 may not be provided in this embodiment.

The holding component 1321 may carry the connection component 11*b* and move to the position of line A in FIG. 34*b*, and the toner may be discharged from the toner cartridge through the discharge channel.

After the connection component 11*b* is received by the holding component 1321, the guide component 431 may stay at the position B, and the holding component 1321 waiting for the return (taking out the toner cartridge) may "send" the connection component 11*b* to the guide component 431. The B position may be located at the first end component 184*a* near the guide groove 184.

Further, when the toner cartridge is taken out, the holding component 1321 may move in the opposite direction, and the movable guide component 431 and the movable holding component 1321 may abut against each other to receive the connection component 11*b*. There is basically no poor connection during the docking process.

Embodiment 10

As shown in FIGS. 35 to 39, on the basis of Embodiment 1, this embodiment provides another guide component X31 that can be stretched and folded. Specifically, the guide component X31 may include a first portion X31*a*, a second portion X31*b* and a pusher. The first part X31*a* may be fixedly arranged on the side wall of the fixed toner discharge plate 180. The first part X31*a* may be preset with a rail. The second part X31*b* may be a movable structure, and may further include a third force-receiving block X34. The third force-receiving block X34 may be disposed at a rear end of second part X31*b* (an end of the second part X31*b* that is closer to the cartridge body 120 is the rear end). The second part X31*b* may slide relative to the first part X31*a* in the preset rail, and its sliding track may be close to the rotation axis L and close to the connection component 160. That is, the guide component X31 and the rail of the first part X31*a* may be inclined in a line L not parallel to the rotation axis, and the second portion X31*b* may slide along the inclined straight line, such that the guide component X31 is able to be stretched and folded. When the connection component 11*b* has not been guided to move, the second portion X31*b* may be pushed forward under the action of a pushing member (such as a spring, elastic sponge, magnet, etc.) and mostly overlap (in a folded state) with the first portion X31*a*. The pushing member may be disposed at the front end of the first portion X31*a* (the end of the first portion X31*a* away from the toner cartridge barrel 120). The trajectory of the guide component X31 guiding the movement of the connection component 11*b* may be that: the connection component 11*b* first enters the area where the second part X31*b* and the first part X31*a* overlap; and as the installation of the toner cartridge continues, the connection component 11*b* abuts against third force-receiving block X34 at the rear end of the second part X31*b* to push the third force-receiving block X34 and make the second part X31*b* slide and extend closer to the rotation axis L along the preset rail and closer to the connection component 160. The connection component 11*b* may reach the position to keep the receiving port 11*a* open.

Embodiment 11

On the basis of Embodiment 2t, this embodiment provides another holding component 132.

Figure 40:
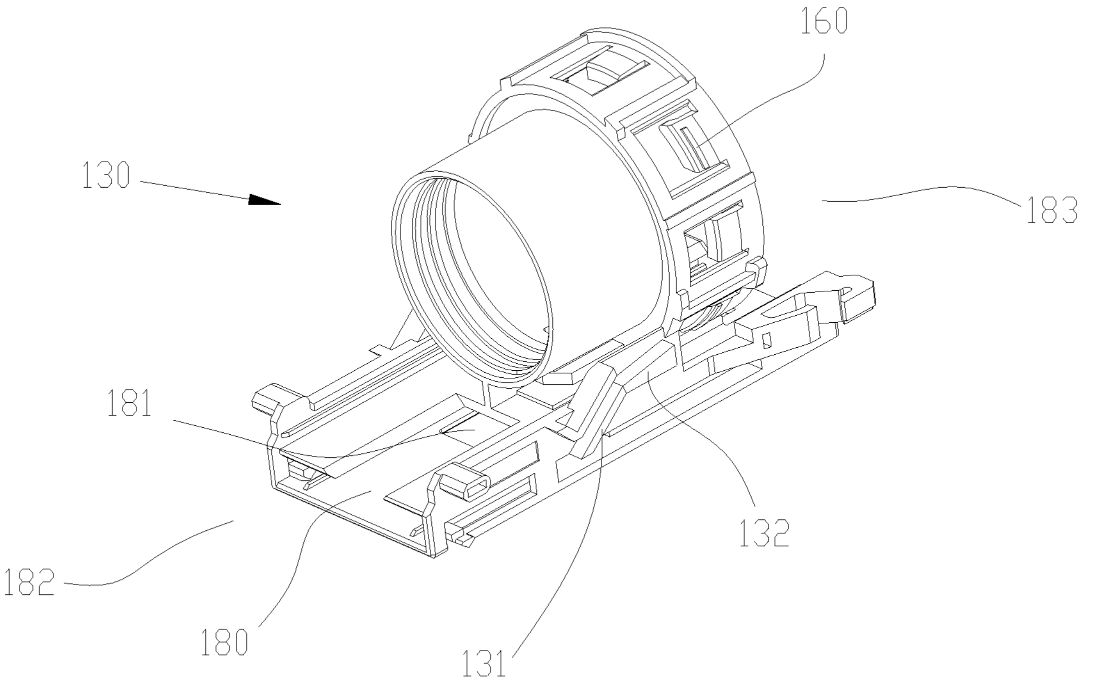
FIG. 40 illustrates a toner discharge structure according to Embodiment 11 of the present disclosure.
Figure 41:
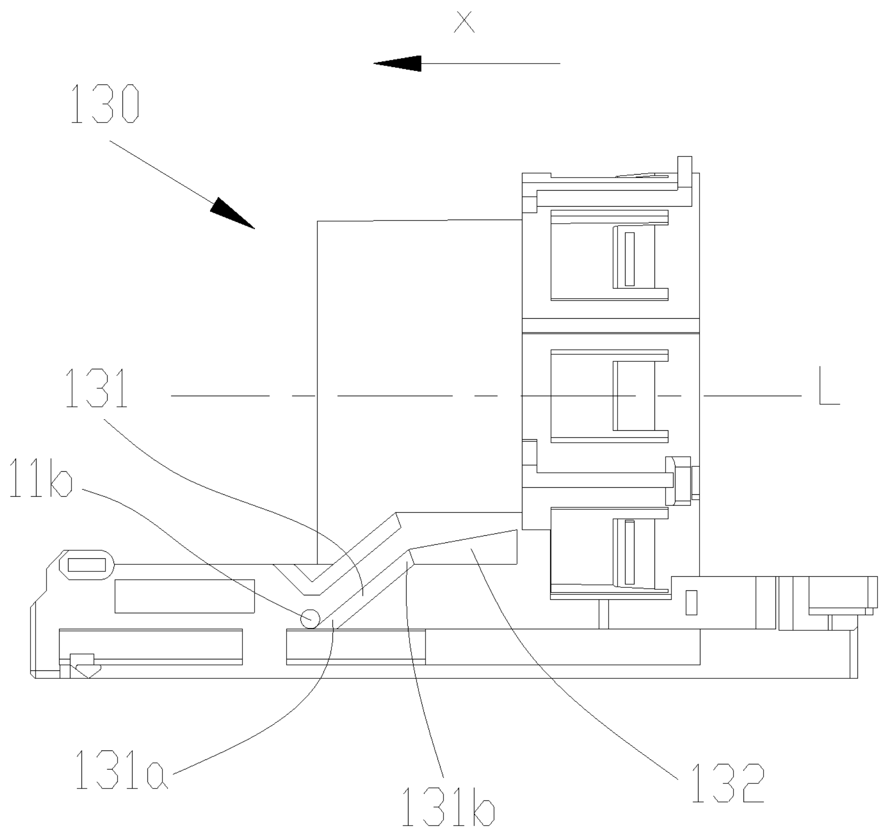
FIG. 41 illustrates a side structure of a toner discharge structure according to Embodiment 11 of the present disclosure.
Figure 42:
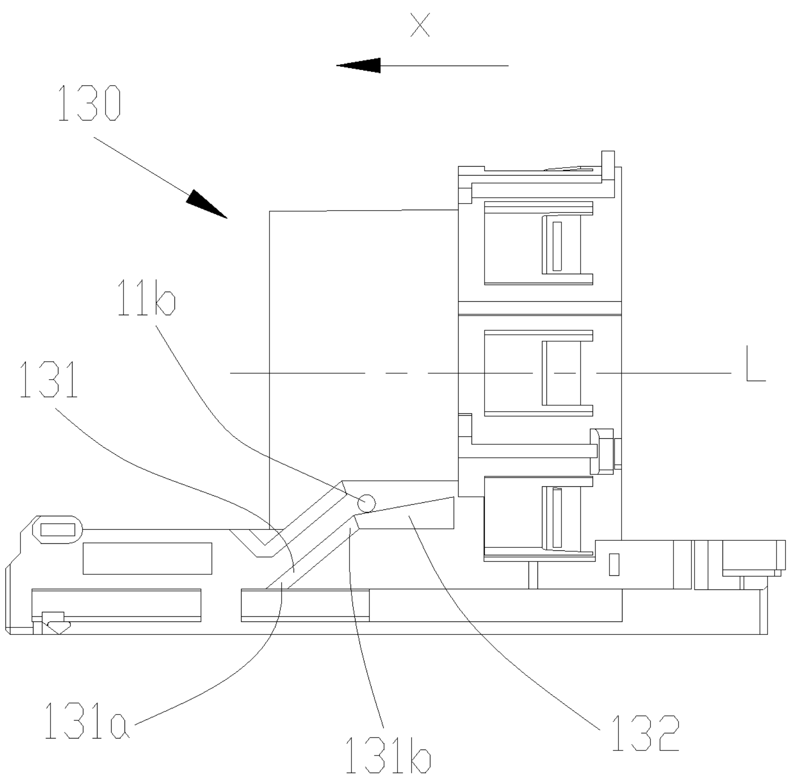
FIG. 42 illustrates another side structure of a toner discharge structure according to Embodiment 11 of the present disclosure.

As shown in FIGS. 40 to 42 where FIG. 41 and FIG. 42 respectively show that the cartridge is located at the first position of the receiving port 11*a* to be opened and the toner cartridge is located at the second position where the discharge channel is formed and the receiving port 11*a* is opened respectively, the toner discharge structure 130 may includes a guide component 131 and a holding component 132. The holding component 132 may be connected with the second end component 131 *b* of the guide component 131. In this embodiment, the holding component 132 may be formed by a frictional elastic structure, for example, in the form of a sponge.

As shown in FIG. 41 and FIG. 42, when the toner cartridge is installed in the electronic imaging device, the toner cartridge may be located at the first position for the receiving port 11*a* to be opened. The connection component 11*b* for opening and closing the receiving port 11*a* may be located at the first end component 131*a* of the guide component 131. As the toner cartridge moves further in the second direction (+X direction in FIG. 41), the guide component 131 may guide the connection component 11*b* to gradually climb to the second end component 131*b*. At this time, the toner cartridge may be located at the second position where the discharge channel is formed and the receiving port 11*a* is opened. The holding component 132 may utilize its high friction to keep the connection component 11*b* in the holding component 132 and keep the position of opening the receiving port 11*a*, such that the developer in the toner cartridge is able to be successfully replenished into the electronic imaging device.

Embodiment 12

Figure 43:
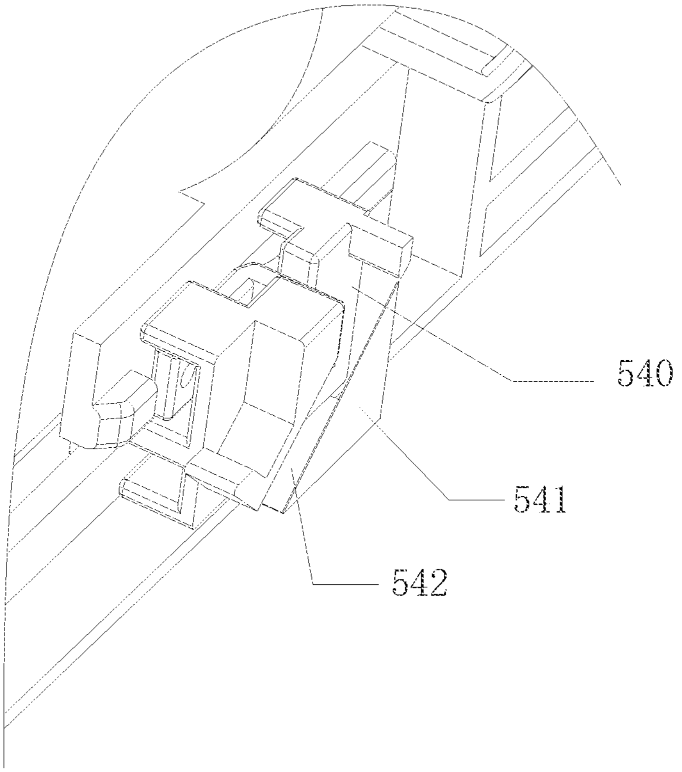
FIG. 43 illustrates a local structure of a toner discharge structure according to Embodiment 12 of the present disclosure.
Figure 44:
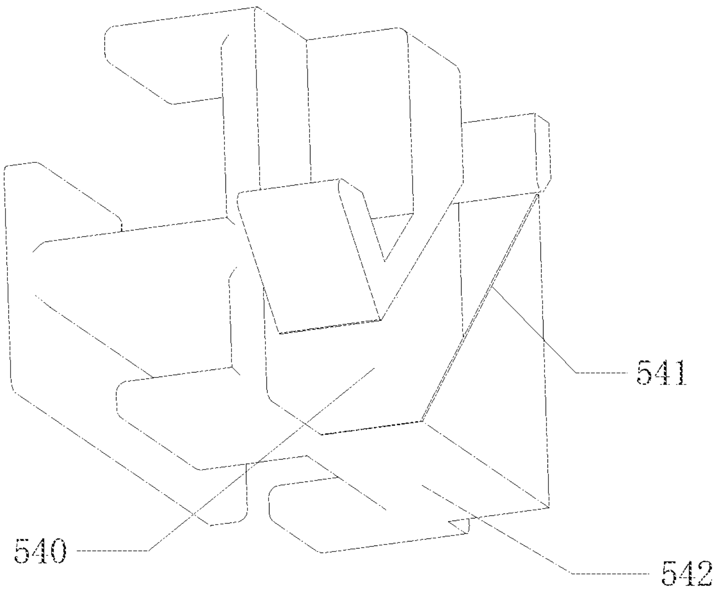
FIG. 44 illustrates a guide component according to Embodiment 11 of the present disclosure.

As shown in FIGS. 43 and 44, on the basis of the above-mentioned embodiments, the guide component 541 may be configured to be a sheet-like structure, and the manner in which the guide component 541 contacts the connection component 11 *b* is a linear contact. Optionally, to facilitate molding, the guide component 541 may have a certain width at the bottom, and a portion of the guide component 541 in contact with the connection component 11*b* may be an inclined line structure. That is, the cross-section of the guide component 541 may be a triangular structure. Specifically, the guide component 541 may be a sheet drawn from a base portion 540, and can be connected with the base portion 540 through a connecting surface 542. The connecting surface 542 may be a surface parallel to the rotation axis.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure.

Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A toner cartridge, detachably installed in an electronic imaging device, the electronic imaging device including a developer replenishing device, the developer replenishing device including a developer receiving component, and the developer receiving component including a movable connection component and a receiving port, the toner cartridge comprising:

a cartridge body, configured for storing developer; and a toner discharge structure, connected to a toner discharge end of the cartridge body and configured for discharging the developer from the toner cartridge, wherein:

the toner discharge structure includes a fixed toner discharge plate, a guide component and a toner outlet, wherein the guide component has a first end component and a second end component;

the toner discharge structure further includes a holding component, wherein when the toner cartridge is installed into the electronic imaging device, the connection component moves from the guide component to the holding component relative to the guide component, such that the developer in the cartridge body is able to flow into the electronic imaging device through the toner outlet and the receiving port; and the guide component is movably disposed on a sidewall of the fixed toner discharge, and the guide component is able to move in a second direction and a direction opposite to the second direction.

2. The toner cartridge according to claim 1, wherein the holding component is closer to the toner outlet than the guide component.

3. The toner cartridge according to claim 2, wherein the guide component is arranged in a straight line and inclined on two opposite sidewalls of the fixed toner discharge plate, and the second end component is located above the first end component in a first direction.

4. The toner cartridge according to claim 1, wherein:

the toner discharge structure further includes a locking component;

the locking component is movably disposed on the guide component;

the locking component has an unlocking position and a locking position on the guide component; and when the locking component moves with the guide component in the direction opposite to the second direction, the locking component is able to be located at the locking position and extends out of the guide component to limit the connection component.

5. The toner cartridge according to claim 1, wherein the holding component and the guide component are arranged at intervals, and the connection component is able to pass over a gap between the guide component and the holding component and then stay on the holding component.

6. The toner cartridge according to claim 5, wherein the holding component is inclined along a straight line where the guide portion is located; or, the holding component extends along the second direction.

7. The toner cartridge according to claim 6, wherein:

when the locking component is located at the locking position, the locking component protrudes out from the guide component, and at least a portion of the locking component is located in the gap between the guide component and the holding component.

8. The toner cartridge according to claim 1, wherein:

the holding component is movably disposed on the sidewall of the fixed toner discharge plate.

9. The toner cartridge according to claim 8, wherein:

the holding component is able to move in the second direction after carrying the connection component that is from guide of the guide component.

10. The toner cartridge according to claim 9, wherein:

the holding component is provided with a guide post, and the side wall of the fixed toner discharge plate is provided with a guide groove matching with the guide post, such that the holding component is able to move along the guide groove.

11. The toner cartridge according to claim 10, wherein:

the holding component is provided with an abutting surface, and the abutting surface abuts the connection component to drive the connection component to move with the holding component.

12. The toner cartridge according to claim 1, wherein:

the guide component is extendable and foldable.

13. The toner cartridge according to claim 12, wherein:

the guide component includes a first part and a second part;

the first part is fixedly arranged on a side wall of the fixed toner discharge plate and is provided with a rail; and the second part is able to slide in the rail with respect to the first part.

14. The toner cartridge according to claim 13, wherein:

the guide component includes a pusher, and the second part is provided with a third force-receiving block;

before the toner cartridge is installed in the electronic imaging device, the pusher acts on the second part to make the second part be in a folded state in which most of the first part overlaps; and when the toner cartridge is installed on the electronic imaging device, the connection component abuts against the third force-receiving block and pushes third force-receiving block to make the second part slide and extend along the rail.

15. The toner cartridge according to claim 1, wherein:

the holding component is connected to the second end component of the guide component.

16. The toner cartridge according to claim 15, wherein:

the holding component includes an elastomer structure.

17. The toner cartridge according to claim 1, wherein:

the guide component includes a sheet structure, and a contact between the guide component and the connection component includes a line contact.

* * * * *